(12) United States Patent
Fujii et al.

(10) Patent No.: US 11,269,579 B2
(45) Date of Patent: Mar. 8, 2022

(54) INFORMATION PROCESSING DEVICE, INFORMATION PROCESSING METHOD AND PROGRAM

(71) Applicant: TOYOTA JIDOSHA KABUSHIKI KAISHA, Toyota (JP)

(72) Inventors: Shinichiro Fujii, Kawasaki (JP); Hiroe Fukui, Toyohashi (JP); Takashi Goto, Okazaki (JP); Tatsuya Shigekiyo, Okazaki (JP); Kuniaki Jinnai, Nagoya (JP); Naoto Sasagawa, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/705,499

(22) Filed: Dec. 6, 2019

(65) Prior Publication Data

US 2020/0233626 A1    Jul. 23, 2020

(30) Foreign Application Priority Data

Jan. 17, 2019    (JP) .............................. JP2019-005946

(51) Int. Cl.
   *G09G 5/00*    (2006.01)
   *G06F 3/14*    (2006.01)
   *G09G 5/37*    (2006.01)

(52) U.S. Cl.
   CPC ............. *G06F 3/1446* (2013.01); *G09G 5/37* (2013.01); *G09G 2360/04* (2013.01)

(58) Field of Classification Search
   CPC ..... G06F 3/1446; G09G 2360/04; G09G 5/37
   See application file for complete search history.

(56) References Cited

U.S. PATENT DOCUMENTS

| | | | |
|---|---|---|---|
| 2014/0136414 A1* | 5/2014 | Abhyanker | G06Q 10/087 705/44 |
| 2014/0237367 A1* | 8/2014 | Jung | G06F 3/04845 715/728 |
| 2016/0161265 A1* | 6/2016 | Bagheri | G01C 21/32 701/450 |
| 2018/0107442 A1* | 4/2018 | Cope | G06F 3/1431 |

FOREIGN PATENT DOCUMENTS

JP    2016-065938 A    4/2016

* cited by examiner

*Primary Examiner* — Insa Sadio
(74) *Attorney, Agent, or Firm* — Oblon, McClelland, Maier & Neustadt, L.L.P.

(57) ABSTRACT

An information processing device includes a control unit that executes: acquiring information indicating an environment surrounding a place where a plurality of movable objects is disposed, the plurality of movable objects including display units that display a picture to configure an external appearance; deciding a display content of the picture to be displayed by the display units included in the plurality of movable objects, depending on the information indicating the environment surrounding the place; and giving an instruction to cause the display units to display the picture having the decided display content, to the plurality of movable objects disposed at an area surrounding the place.

8 Claims, 19 Drawing Sheets

FIG. 5

| REGION ID | GROUP ID | ASSEMBLY AREA ID | VEHICLE ID | OPERATOR ID | BASE ID | CURRENT POSITION | OPERATION STATE | ASSEMBLY FORM |
|---|---|---|---|---|---|---|---|---|
| ... | ... | ... | ... | ... | ... | ... | ... | ... |
| D000A | G001 | A01, A02, A03, A04 | S0101 | aa | a1 | X1, Y1 | IN OPERATION | ... |
| | | | ... | ... | ... | ... | ... | ... |
| | G002 | A05, A06, A07 | S0201 | bb | b1 | X2, Y2 | IN SERVICE | CIRCLE |
| | | | ... | ... | ... | ... | ... | ... |
| ... | ... | | ... | ... | ... | ... | ... | ... |

FIG. 8

| VEHICLE ID | SHOP NAME | HANDLING PRODUCT | OPERATOR ID | OPERATING HOURS | VEHICLE SIZE | CAPACITY | CURRENT POSITION | EXTERNAL APPEARANCE | ASSEMBLY FORM |
|---|---|---|---|---|---|---|---|---|---|
| S101 | ... | FRUITS | aa | 10:00-18:00 | W1, H1, D1 | 7 | ... | BBB-1 | U-FORM |
| S102 | ... | MEATS | ab | | W1, H1, D1 | 7 | ... | BBB-2 | |
| S103 | ... | DAILY SUNDRIES | ac | | W2, H2, D2 | 12 | ... | BBB-3 | |
| S104 | ... | SEAFOOD | ad | | W1, H1, D1 | 7 | ... | BBB-4 | |
| S105 | ... | VEGETABLES | ae | | W1, H1, D1 | 7 | ... | BBB-5 | |

FIG. 10

| HOUR | SURROUNDING ENVIRONMENT | | | | | USER TENDENCY | | OPERATION STATE |
|---|---|---|---|---|---|---|---|---|
| | POSITION | KIND | METEOROLOGICAL CONDITION | ATMOSPHERE | BRIGHTNESS | AGE GROUP | SEX | |
| 20181101 1010 | A01 | RESIDENTIAL SECTION | FAIR; 13°C; 62% | SILENT | BRIGHT | 60 | FEMALE | IN SERVICE |
| 20181101 1000 | A01 | RESIDENTIAL SECTION | FAIR; 11°C; 68% | SILENT | BRIGHT | 60 | FEMALE | IN SERVICE |
| ... | ... | ... | ... | ... | ... | ... | ... | ... |
| ⋮ | ⋮ | ⋮ | ⋮ | ⋮ | ⋮ | ⋮ | ⋮ | ⋮ |

FIG. 11

| PICTURE ID | DISPLAY CONTENT | COLOR SCHEME TENDENCY | PICTURE DATA | PARTIAL DATA | RELEVANT DATA |
|---|---|---|---|---|---|
| ... | ... | ... | ... | ... | ... |
| VA10001A | DECORATION FOR PARTY (RIBBON) | COLD COLORS | BBA | BBA-1 to BBA-5 | |
| VA10001B | | WARM COLORS | BBB | BBB-1 to BBB-5 | |
| VA10001C | | INTERMEDIATE COLORS | BBC | BBC-1 to BBC-5 | |
| ... | ... | ... | ... | ... | ... |

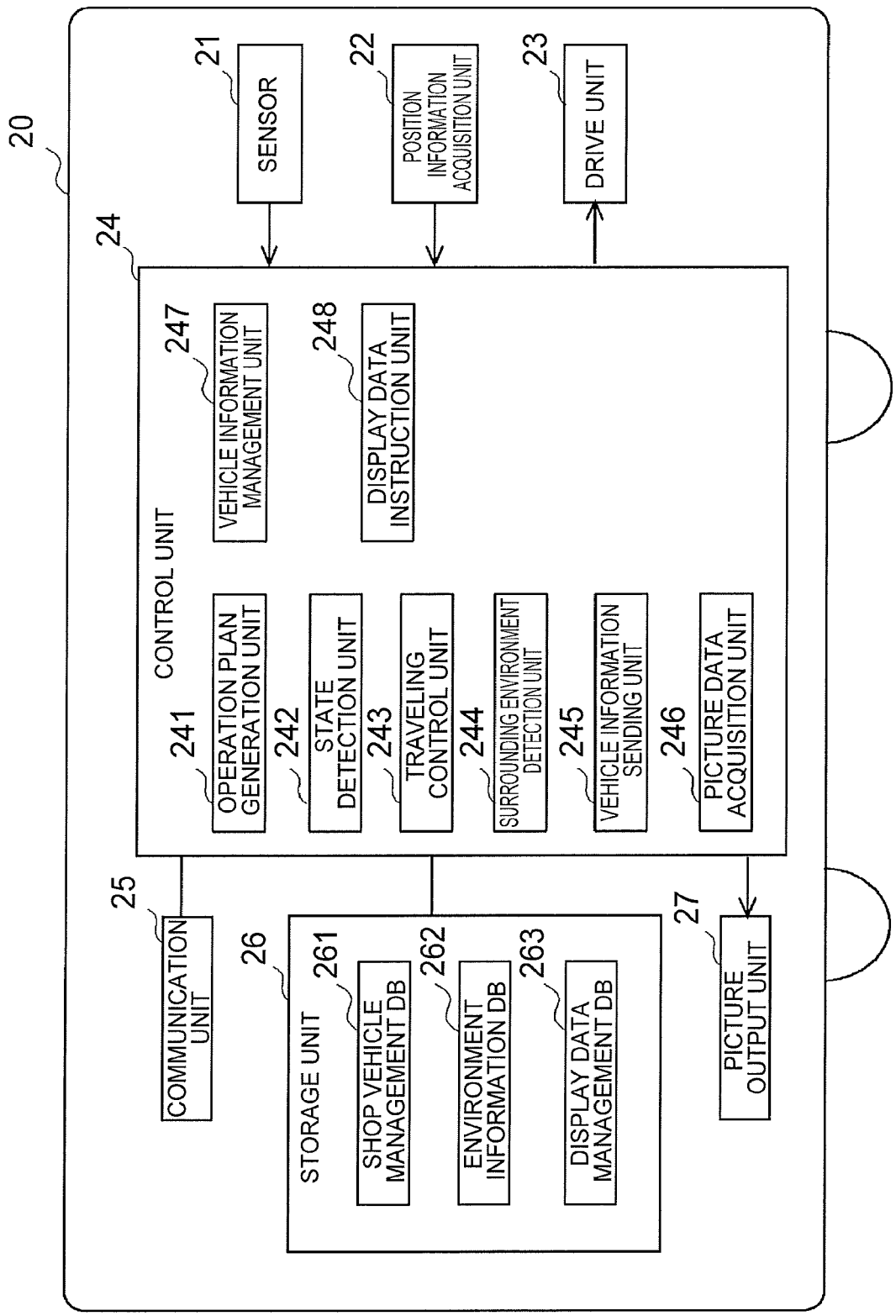

INFORMATION PROCESSING DEVICE, INFORMATION PROCESSING METHOD AND PROGRAM

INCORPORATION BY REFERENCE

The disclosure of Japanese Patent Application No. 2019-005946 filed on Jan. 17, 2019 including the specification, drawings and abstract is incorporated herein by reference in its entirety.

BACKGROUND

1. Technical Field

The disclosure relates to an information processing device, an information processing method and a program for a system that manages the external appearance of a movable object having multiple functions.

2. Description of Related Art

In recent years, there has been performed a research for providing services with multiple functions of a movable object such as a vehicle that can perform autonomous traveling. For example, there can be a form in which the space in the movable object such as the vehicle that can perform autonomous traveling has not only a function for movement of people or goods but also a function as a shop that sells a product or provides a labor service. For example, in the case where the vehicle or the like functions as a movable shop, it is conceivable to provide a display device on an outer wall of a vehicle body, and to change the exterior decoration (external appearance) of the shop by changing the content to be displayed by the display device depending on the content of the product sale or labor service by the shop. Japanese Patent Application Publication No. 2016-65938 discloses a technology in which a vehicle including a display device causes the display device to display an advertisement corresponding to a peripheral environment of the vehicle.

It is also conceivable to construct a movable market that deals with daily commodities, sundry articles, foodstuffs and the like, using a plurality of movable objects such as vehicles that function as shops. The movable market is periodically operated on a previously decided route, or is periodically formed at a previously permitted place or the like, allowing provision of a shopping support service with consideration for movement burden of a utilizing person.

SUMMARY

In the case where a plurality of movable objects such as vehicles is assembled, it is desirable that presentations of the external appearances of vehicles or the like are unified as a whole, instead of being individually performed. Hence, the disclosure has an object to provide a technology for unifying the external appearances of a plurality of assembled movable objects.

An exemplary aspect of the disclosure is an information processing device. The information processing device includes a control unit that executes: acquiring information indicating an environment surrounding a place where a plurality of movable objects is disposed, the plurality of movable objects including display units that display a picture to configure an external appearance; deciding a display content of the picture to be displayed by the display units included in the plurality of movable objects, depending on the information indicating the environment surrounding the place; and giving an instruction to cause the display units to display the picture having the decided display content, to the plurality of movable objects disposed at an area surrounding the place.

Another exemplary aspect of the disclosure is an information processing method. The disclosure may be an information processing method including: acquiring information indicating an environment surrounding a place where a plurality of movable objects is disposed, the plurality of movable objects including display units that display a picture to configure an external appearance; deciding a display content of the picture to be displayed by the display units included in the plurality of movable objects, depending on the information indicating the environment surrounding the place; and giving an instruction to cause the display units to display the picture having the decided display content, to the plurality of movable objects disposed at an area surrounding the place.

Another exemplary aspect of the disclosure is a program that is executed by a computer. The disclosure may be a program that causes a computer to execute: acquiring information indicating an environment surrounding a place where a plurality of movable objects is disposed, the plurality of movable objects including display units that display a picture to configure an external appearance; deciding a display content of the picture to be displayed by the display units included in the plurality of movable objects, depending on the information indicating the environment surrounding the place; and giving an instruction to cause the display units to display the picture having the decided display content, to the plurality of movable objects disposed at an area surrounding the place, or the disclosure may be a computer-readable storage medium in which the program is stored in a non-transitory manner.

With the disclosure, it is possible to provide a technology for unifying the external appearances of a plurality of assembled movable objects.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram showing an example of vehicle information that is stored in a vehicle management DB;

FIG. 8 is a diagram showing an example of shop vehicle information that is stored in a shop vehicle management DB;

FIG. 10 is a diagram showing an example of environment information that is stored in an environment information DB;

FIG. 11 is a diagram showing an example of picture information that is stored in a display data management DB;

FIG. 19 is a diagram showing an example of a functional configuration of a shop vehicle that functions as a leader vehicle in the second modification.

DETAILED DESCRIPTION OF EMBODIMENTS

Figure 1:
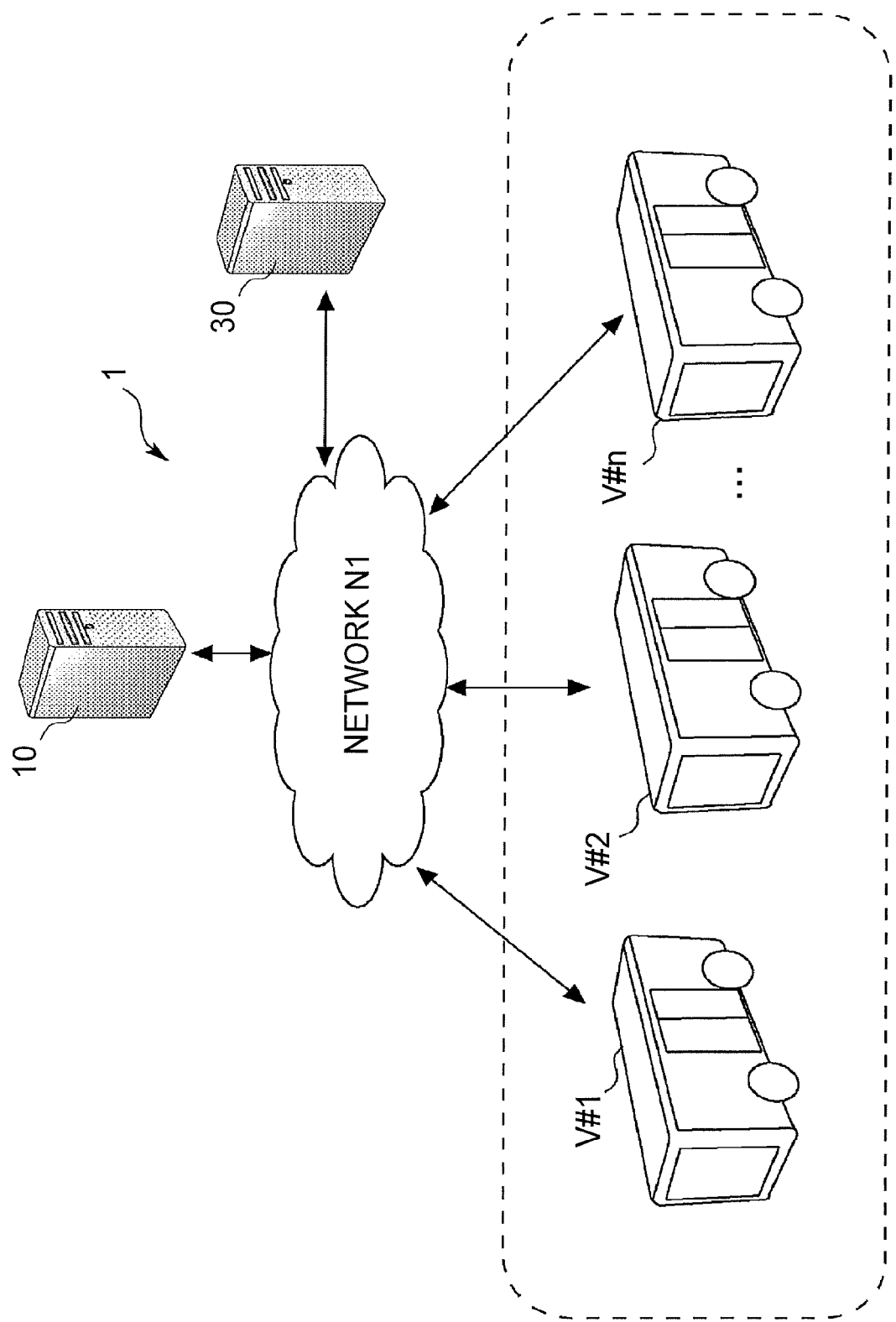
FIG. 1 is a diagram showing an example of a system configuration of a display management system according to a first embodiment.

A display management server according to an embodiment is an information processing device in a system that manages picture data for configuring an external appearance, for a plurality of movable objects that includes display devices for configuring the exterior decoration (external appearance) on an outer wall and the like of a vehicle body, that can perform autonomous traveling, and that has multiple functions. Examples of the movable object include a shop vehicle that includes a facility, equipment or the like for business and that sells a product or provides a labor service. It can be said that a user of the shop vehicle is a utilizing person of the service provided by the shop vehicle or a consumer of the product or the like sold by the shop vehicle.

The display management server according to the embodiment is configured to acquire information indicating an environment surrounding a place where a plurality of movable objects is disposed. The movable objects include display units that display a picture to configure the external appearance. The information indicating the environment includes the kind of the place where the plurality of movable objects is disposed, a scene showing an atmosphere surrounding the place, a meteorological condition such as weather, air temperature and humidity, a brightness, and the like. As the kind of the place, there are a mountainous section and an urban section.

Further, the display management server is configured to decide a display content of the picture to be displayed by the display units included in the plurality of movable objects, depending on the information indicating the environment surrounding the place, and to give an instruction to cause the display units to display the picture having the decided display content, to the plurality of movable objects disposed at an area surrounding the place.

The environment surrounding the place where the plurality of movable objects is disposed can be acquired from sensor information detected through a sensor group including a camera, a thermo-hygro sensor and an illuminance sensor that are mounted on each movable object. Further, the display management server can identify the place where the movable objects are disposed, from position information indicating the positions of the movable objects, and can acquire information indicating the environment surrounding the place, based on the identified place. The display content includes a designation of a content to be displayed by the picture, a designation of a color tone, a designation of a display configuration, a designation of a brightness when the picture is displayed.

Because of such a configuration, the display management server can perform a control such that the plurality of assembled movable objects keeps a unified external appearance, based on the picture data with the display content corresponding to the environment surrounding the place where the plurality of movable objects is disposed.

An embodiment will be described below, with reference to the drawings. A configuration of the embodiment described below is an example, and modes for carrying out the disclosure are not limited to the configuration of the embodiment described below.

First Embodiment

Outline of System

FIG. 1 is a diagram showing an example of a system configuration of a display management system 1 according to a first embodiment. The display management system 1 in FIG. 1 functions as a part of a movable object system that provides services by using multiple functions of the movable object such as the vehicle that can perform the autonomous traveling, or as a complementary system that cooperates with the movable object system.

First, an outline of the movable object system will be described. For example, the movable object system is configured to include a plurality of movable objects (V #1 to V #n) such as a vehicle that can perform the autonomous traveling on a road based on a given command, and a center server 10 that issues the command. Each movable object provides mobility services such as a user movement, a parcel transport, a product sale and a labor service, depending on various needs of a utilizing person (hereinafter, also referred to as a "user"). Each movable object and the center server 10 are connected with each other through a network N1. Hereinafter, the movable object such as the vehicle that can perform the autonomous traveling is also referred to as merely a "vehicle", and the plurality of movable objects (V #1 to V #n) is also collectively referred to as a "vehicle V".

As the vehicle V, for example, there is a self-propelled electrically driven vehicle that is called an electric vehicle (EV) pallet. However, the vehicle V may be a gasoline vehicle, a diesel vehicle, or a vehicle that is operated by electric power supplied from a fuel cell using hydrogen and the like. The vehicle V is a multipurpose movable object that allows change in exterior decoration and interior decoration of the vehicle V and selection of an arbitrary vehicle size depending on usage and purpose of the mobility service to be provided. The center server 10 is a device that manages a plurality of vehicles V constituting the movable object system, and gives an operation command to the vehicles V.

For example, the network N1 is a public network such as the Internet. The network N1 may include a wireless communication such as WiFi®, a wireless network including a mobile telephone network such as LTE, LTE-Advanced and 3G, a dedicated network such as a virtual private network (VPN), and a network such as a local area network (LAN). A display management server 30 (hereinafter, also referred to as merely a "management server 30") constituting the display management system 1 according to the embodiment is connected to the network N1. In FIG. 1, one center server 10, one management server 30 and a plurality of vehicles (V #1 to V #n) are representatively illustrated. A plurality of center servers 10 and a plurality of management servers 30 can be connected to the network N1.

In the movable object system to which the display management system 1 according to the embodiment is applied, the vehicle V functions as a shop vehicle that sells a product or provides a labor service (hereinafter, the vehicle V that functions as a shop is also referred to as a "shop vehicle 20"). For example, the shop vehicle 20 includes a facility, equipment or the like for shop business, within the vehicle. As shown by a broken-line rectangular box in FIG. 1, the shop vehicles 20 periodically operate on a previously decided route in an urban section or a predetermined region, or periodically assemble at a previously permitted place or the like, and thereby, constitute a movable market that deals with daily commodities, sundry articles, foodstuffs and the like. For example, the movable market can integrally provide different types of services, and can provide a shopping support service with consideration for movement burden of the user.

A destination where the shop vehicles 20 assemble may include a road, and a shop (a movable shop other than the vehicle V or a fixed shop) other than the shop vehicle 20 may be included. The shop vehicle 20 does not always need to be an unmanned vehicle, and a sales staff, a service staff, a security staff or the like that sells the product dealt with by the shop vehicle 20 or provides the labor service to the user that uses the service may ride on the shop vehicle 20. Further, the shop vehicle 20 does not always need to be a vehicle that constantly performs the autonomous traveling. For example, depending on a situation, the staff may drive, or may assist driving.

The shop vehicle 20 includes display devices for configuring the exterior decoration (external appearance), on outer walls and the like of the vehicle body. Then, the display management system 1 according to the embodiment manages picture data to be displayed on the display devices provided on the outer walls and the like of the shop vehicle 20, and displays the picture data such that the plurality of movable objects constituting the movable market keeps a unified external appearance.

Figure 2:
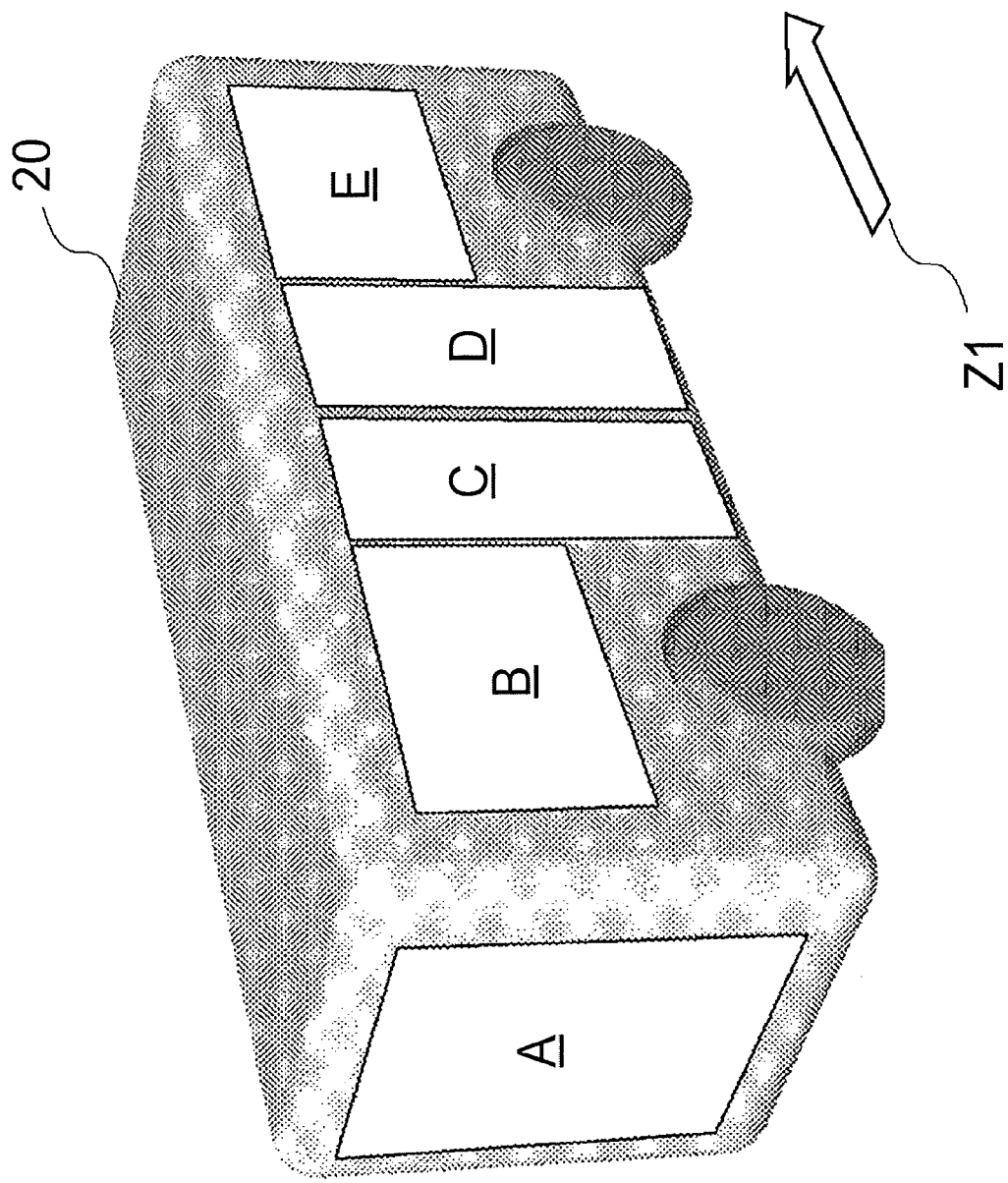
FIG. 2 is a diagram showing an example of the external appearance of a shop vehicle.

FIG. 2 is a diagram showing an example of the external appearance of the shop vehicle 20 according to the embodiment. As shown by reference characters A to E in FIG. 2, the outer walls of the vehicle body constituting the shop vehicle 20 are provided with vehicle-outside display devices that can output arbitrary pictures for configuring the external appearance. In FIG. 2, as shown by an outlined arrow Z1, a vehicle direction indicating the orientation of the shop vehicle 20 is a direction of the side facing a vehicle-outside display device A provided on the rear side of the shop vehicle 20.

The vehicle-outside display device may be a liquid crystal display (LCD), or may be an organic electro-luminescence (EL) display. The vehicle-outside display may be constituted using a light emitting diode (LED) matrix, a projector that projects a picture on a window glass of the shop vehicle 20, or the like. The shop vehicle 20 including the vehicle-outside display devices on the outer walls can change the external appearance of the shop vehicle 20, for example, by switching the picture to be displayed on the display devices, or the display content such as a color tone, an atmosphere or a brightness. Hereinafter, the vehicle-outside display device provided on the shop vehicle 20 is also referred to as a "display unit".

The display management system 1 according to the embodiment includes the management server 30 that manages the picture data to be displayed by the vehicle-outside display devices provided on the outer walls and the like of the shop vehicle 20. The picture data, to which identification information (picture ID) for uniquely identifying the picture data is given, is held in a database. The management server 30 according to the embodiment acquires environment information relevant to an environment surrounding the place where the plurality of shop vehicles 20 is disposed for integrally providing different types of services in the movable market.

Here, examples of the environment information include information indicating the kind (an urban section, a residential section, a mountainous section, a coastal section or the like) of the place where the plurality of shop vehicles 20 is positioned. The environment information may include a scene (landscape) of the place where the plurality of shop vehicles 20 is disposed, a meteorological condition, a brightness, or the like.

The management server 30 refers to the picture data held in the database, and identifies the picture data with the display content corresponding to the environment information surrounding the place where the plurality of shop vehicles 20 is disposed for providing the integral service in the movable market.

The picture data to be identified may be an identical kind of picture data that is displayed by the plurality of shop vehicles 20 in common, or may be multiple kinds of picture data that have a relevance and that are respectively displayed by the plurality of shop vehicles 20 such that the plurality of shop vehicles 20 keeps a unity sense. Examples of the picture data having a relevance include a series of three kinds of picture data under the theme of cherry blossom viewing, as exemplified by "cherry blossom tree", "cherry blossom petals" and "multi-tiered food box with fluttering cherry blossom petals". Further, examples of the picture data having a relevance include picture data about an illustrated story (for example, a set of Heian pictures) divided into multiple kinds of partial data. The shop vehicles 20 each of which displays the partial data are arrayed in a division order, and thereby, the external appearances of the shop vehicles 20 can be controlled so as to configure a single illustrated story as a whole.

The management server 30 gives an instruction to display the picture data with the display content identified depending on the environment surrounding the place where the movable market is formed, to the plurality of shop vehicles 20 disposed at the place. The shop vehicles cause the respective display units (vehicle-outside display devices) to display the picture data with the display content instructed from the management server 30, and thereby, can unify the external appearances to an external appearance corresponding to the environment surrounding the place where the movable market is disposed. The display management system 1 according to the embodiment can provide a technology for keeping a unified external appearance at the place where the plurality of shop vehicles 20 is disposed.

Figure 3:
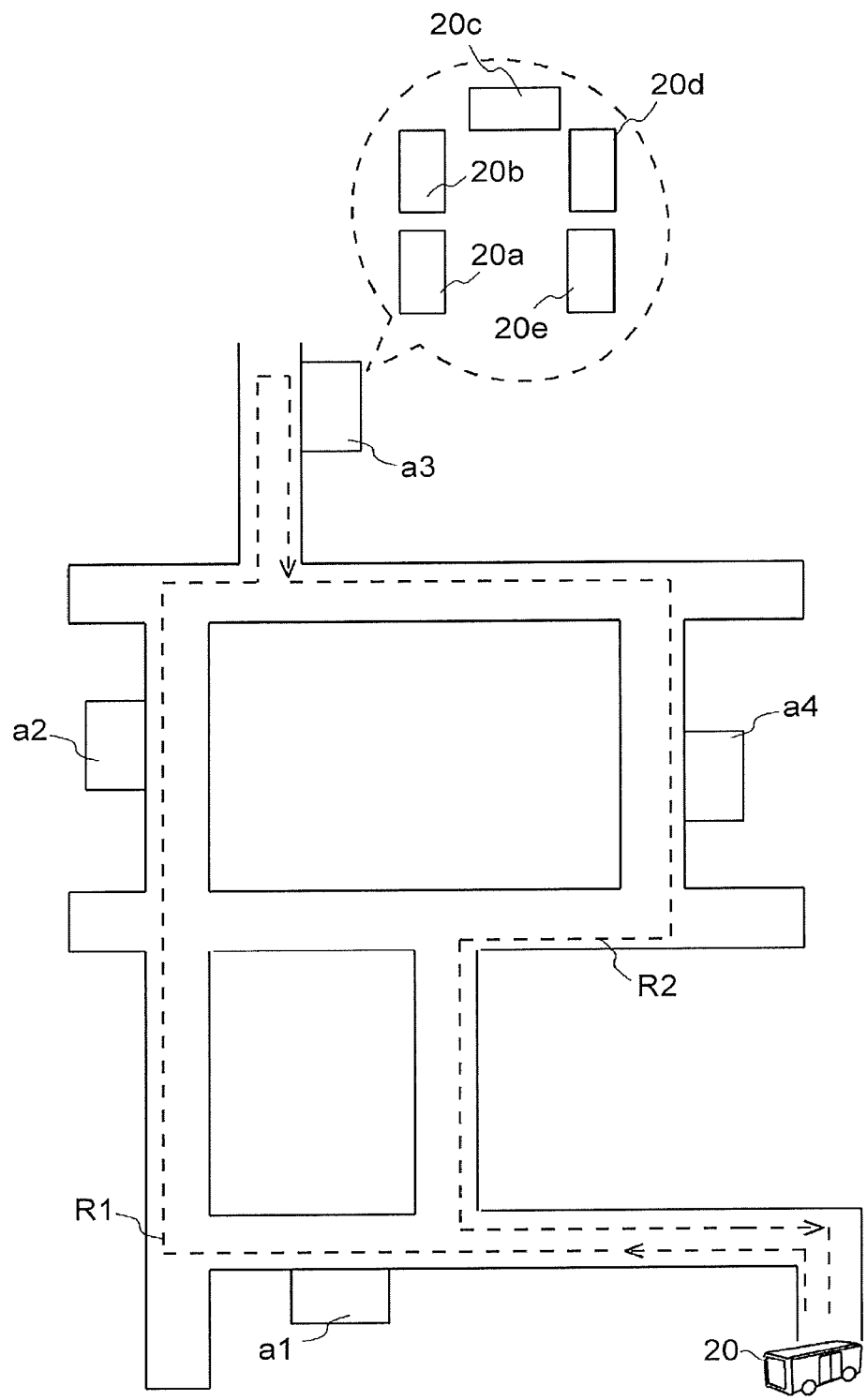
FIG. 3 is a diagram for describing selection of picture data.

FIG. 3 is a diagram for describing selection of picture data. In FIG. 3, for example, the plurality of shop vehicles 20 periodically operates along routes R1, R2 shown by broken line arrows. For example, places a1, a2, a3, a4 positioned along the routes R1, R2 are areas at which the movable market is previously permitted to be disposed. For example, the plurality of shop vehicles 20 goes round along the routes R1, R2 in a row, and moves to each area. As shown in a broken-line balloon, in each area, the plurality of shop vehicles 20 that sells products such as daily commodities, sundry articles and foodstuffs is disposed, and the movable market that integrally provides different types of services to the user is configured. Here, a form shown in the broken-line balloon in FIG. 3 is an exemplary form in which five shop vehicles (20a to 20e) are disposed (arranged) in a U-form. In the shop vehicles disposed in a U-form, for example, the shop vehicle 20a sells fruits as the product, and the shop vehicle 20e sells vegetables. Further, for example, the shop vehicle 20b and the shop vehicle 20d, which include refrigerating equipment, sell meats and seafood, respectively. For example, the shop vehicle 20c sells daily sundry articles such as sanitary goods and household daily commodities.

For example, the management server 30 acquires the environment information relevant to the environment when the plurality of shop vehicles 20 operates along the routes R1, R2, or the environment surrounding the place (a1 to a4) where the plurality of shop vehicles 20 is disposed. For example, as the environment information, the management server 30 acquires information that is relevant to an area where the plurality of shop vehicles 20 operates or an area where the plurality of shop vehicles 20 is disposed, and that indicates the kind of the place, as exemplified by the urban section, the residential section, the mountainous section and the coastal section. Further, as the environment information, the management server 30 acquires information indicating the scene, meteorological condition, brightness and others of the area where the plurality of shop vehicles 20 operates or the area where the plurality of shop vehicles 20 is disposed. Here, as the environment information, the management server 30 may acquire information indicating a disposition form (a relative arrangement relation among the shop vehicles) in the area where the plurality of shop vehicles 20 is disposed.

For example, as described later, the environment information is acquired as a camera picture picked up by a sensor such as a camera that is mounted on the shop vehicle 20 or as sensor information detected by a sensor that detects another physical quantity. However, the management server 30 may identify the area where the plurality of shop vehicles 20 operates or the area where the plurality of shop vehicles 20 is disposed, based on position information such as a latitude, a longitude and the like sent from the shop vehicles 20 periodically or in response to a demand from the management server 30, and may acquire the environment information indicating the environment surrounding the place where the plurality of shop vehicles 20 is disposed. For example, by referring to map data or the like, the management server 30 can identify the environment information indicating the kind of the place, from the position information about the area where the plurality of shop vehicles 20 operates or the area where the plurality of shop vehicles 20 is disposed. For example, the position information may include identification information (for example, a link number) about a road on which the shop vehicles 20 plan to travel, identification information (for example, a node number) about an intersection or the like, an address, and the like.

For example, the management server 30 may acquire a camera picture to be obtained by photographing the surrounding of the place identified based on the position information, from a service site on the network N1 that provides the camera picture. Based on the camera picture, the management server 30 can estimate the environment information about the area where the plurality of shop vehicles 20 operates or the area where the plurality of shop vehicles 20 is disposed. The environment information includes the kind of the place, as exemplified by the urban section, the residential section, the mountainous section and the coastal section, and includes the scene, the weather condition and the like. The management server 30 may acquire the environment information indicating the meteorological condition surrounding the place identified by the position information, from a service site on the network N1 that provides meteorological information. The meteorological condition includes a weather, an air temperature, a humidity, a wind direction, a wind speed and the like. Then, based on the acquired environment information, the management server 30 selects the picture data with the display content corresponding to the environment information, for configuring a unified external appearance of the plurality of shop vehicles 20.

In FIG. 3, it is assumed that the kinds of the places a1, a2, a3, a4 are a residential section, an urban section, a mountainous section and a coastal section, respectively. As the picture data to configure the external appearance of the plurality of shop vehicles 20 disposed at the place a1, for example, the management server 30 can select an identical kind of or relevant kinds of picture data with a display content in which play equipment provided in a park, a decoration for a party, or the like is adopted as a motif. At the place a2 that is an urban section, for example, the management server 30 selects an identical kind of or relevant kinds of picture data with a display content in which a tree, a fountain or the like is adopted as a motif and healing at an oasis or the like is evoked. At the place a3 that is a mountainous section, for example, the management server 30 selects an identical kind of or relevant kinds of picture data with a display content in which the color tone of the landscape acquired as the environment information is adopted as a base, or with a display content in which a festival, an illustrated story or the like corresponding to the season is adopted as a motif. At the place a4 that is a coastal section, for example, the management server 30 selects an identical kind of or relevant kinds of picture data with a display content in which the sea, a sandy beach, a cloud floating in the fine sky, a seabird or the like is adopted as a motif and freshness is evoked.

For example, the picture data may be controlled such that the degree of a display element such as the color tone (color hue), the atmosphere (color scheme), the brightness (luminance and the like) for display is increased or decreased depending on the meteorological condition, the brightness (illuminance), or the like. For example, the picture data with a checkered pattern can be controlled in the summer season such that a combination of cold colors such as blue and white is selected and emphasized, and can be controlled in the winter season such that a combination of warm colors such as orange and brown is selected and emphasized. Furthermore, the picture data can be controlled such that the brightness (luminance) when the picture data is displayed is increased or decreased depending on the illuminance acquired as the surrounding environment. For example, in fair weather, the picture data may be displayed such that the brightness is enhanced, and in cloudy weather or rainy weather, the picture data may be displayed such that the brightness is weakened (decreased).

The same goes for the case where the plurality of shop vehicles 20 moves to each place along the routes R1, R2. The management server 30 selects the picture data with a display content for unifying the external appearances of the shop vehicles 20 during traveling, based on the environment information acquired by a sensor such as the camera that is mounted on each shop vehicle 20 or the environment information identified based on the position information. For example, when the shop vehicles 20 travel in an urban section, the management server 30 selects an identical kind of or relevant kinds of picture data with a stylish display content in which a background color is deep blue and a silver, gray or white bird feather or the like is adopted as a motif. When the shop vehicles 20 travel in a mountainous section, the management server 30 selects an identical kind of relevant kinds of picture data with a mild display content such as a gradation image in which the color tone of the landscape is adopted as a base and an area surrounded by a curve is colored so as to be continuously changed.

For example, the picture data may include picture data with a display content in which letters "MOVABLE MARKET" are adopted as a motif. For example, as the picture data, the letters "MOVABLE MARKET" colored on a predetermined background color are displayed. When the plurality of shop vehicles 20 goes round in a row, the picture data with the display content in which the above letters are adopted as a motif may be displayed such that the background color and the colors of the letters are continuously changed in the order from the head. Further, the letter string "MOVABLE MARKET" may be divided into a plurality of partial parts, for example, into partial data of "MOVABLE", "MAR" and "KET", and may be displayed by a plurality of shop vehicles 20 that goes round in a row, in the order from the head. In this display manner also, the background color and the colors of the letters may be continuously changed in the order from the head.

Furthermore, in the selection of the display content of the picture data, the management server 30 may consider attributes of users that exist in the periphery of the plurality of shop vehicles 20 during traveling or the plurality of shop vehicles 20 disposed at the predetermined place (a1 to a4). For example, by pattern matching or the like, the management server 30 extracts face images of users that exist in the periphery of the shop vehicles 20, from an image photographed by the cameras mounted on the shop vehicles 20. Then, the management server 30 evaluates the number of the extracted face images, that is, the number of persons, and estimates age and sex by analyzing the extracted face images. Then, the management server 30 can select the picture data with a display content corresponding to the number of users that exist in the periphery of the shop vehicles 20, the age, the sex and the like. As an example, in the case where the ratio of female users is relatively high, the management server 30 selects an identical kind of or relevant kinds of picture data with a display content in which a small animal such as a cat or a dog is adopted as a motif. The estimation of the information relevant to attributes such as the age and the sex, which are attributes of the user who exists in the periphery of the shop vehicles 20, may be performed by each shop vehicle.

Functional Configuration

Next, functional configurations of the center server 10, the shop vehicle 20 and the management server 30 of the display management system 1 according to the embodiment will be described with reference to FIG. 4 to FIG. 11. As described already, the center server 10 is a server device that manages a plurality of vehicles V constituting the movable object system, and that gives the operation command to the vehicles V, but hereinafter, only the shop vehicle 20 will be described as the management object of the center server 10.

Figure 4:
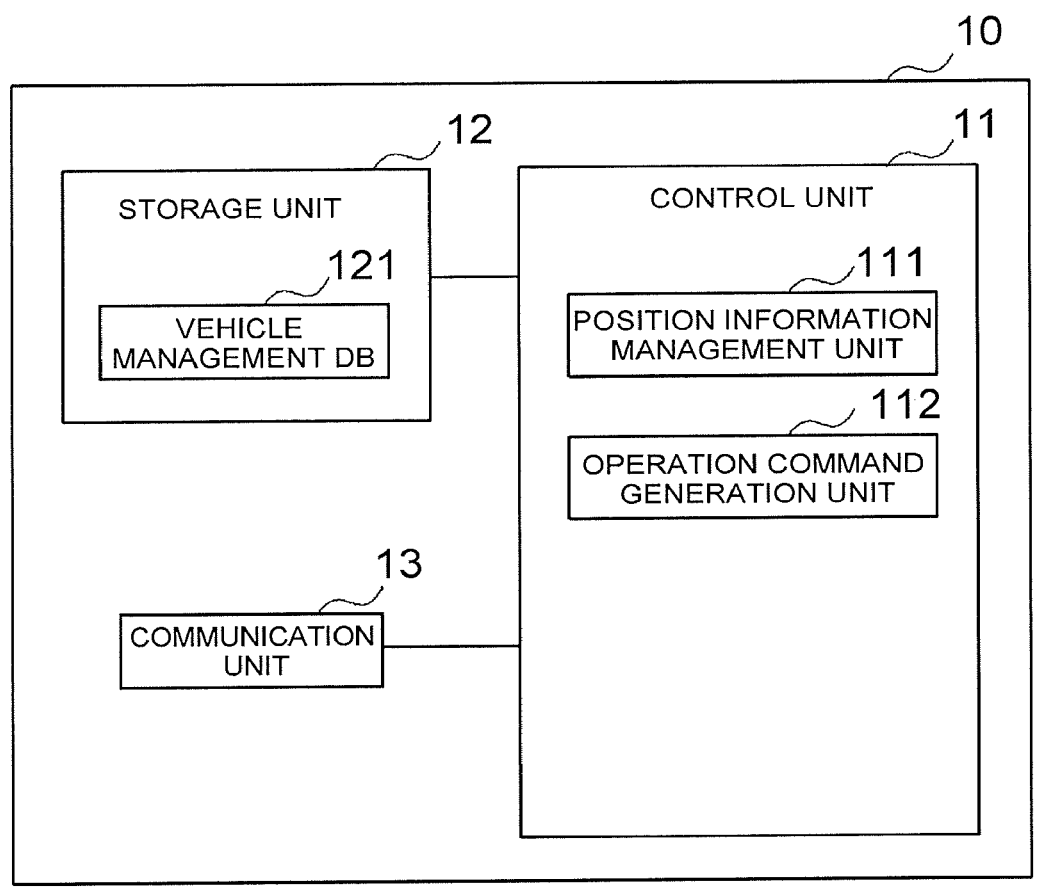
FIG. 4 is a diagram showing an example of a functional configuration of a center server.

FIG. 4 is a diagram showing an example of the functional configuration of the center server 10. The center server 10 is configured to include a control unit 11, a storage unit 12 and a communication unit 13, as functional constituent elements. The communication unit 13 is a communication interface for the network N1. For example, the communication unit 13 includes a LAN interface board and a wireless communication circuit for wireless communication.

In the display management system 1, the center server 10 is a server device that manages the autonomous traveling of the plurality of shop vehicles 20, and that generates the operation command to the shop vehicles 20. For example, the center server 10 is a general-purpose computer that includes a processor, a main storage device and an auxiliary storage device. The processor includes a central processing unit (CPU), a digital signal processor (DSP), a graphics processing unit (GPU), and the like. The main storage device includes a flash memory, a random access memory (RAM), a read only memory (ROM), and the like. The auxiliary storage device is a non-volatile storage device that stores a variety of programs including an operating system (OS) and a variety of data in a recording medium in a readable and writable manner. The OS includes a communication interface program that performs transfer of data with an external device or the like to be connected through the communication unit 13. Examples of the auxiliary storage device include a portable recording medium, a flash memory, a hard disk drive (HDD) and a solid state drive (SSD). For example, the portable recording medium is a universal serial bus (USB) memory, or a disc recording medium such as a compact disc (CD), a digital versatile disc (DVD) or a Blu-ray® disc. The processor executes a computer program expanded in a workspace of the main storage device in an executable manner, and controls the whole of the center server 10. The processor controls peripheral equipment by executing the computer program, and thereby, provides functions appropriate for predetermined purposes as described later. Here, some functions may be provided as hardware circuits such as an application specific integrated circuit (ASIC), a field-programmable gate array (FPGA), a numerical processor and an image processing processor. The center server 10 may be constituted by a single computer, or may be constituted by a plurality of computers that cooperates with each other.

The control unit 11 is an information processing function that is provided by the execution of the computer program by the processor. Through the control unit 11, there is provided an information processing function to manage the autonomous traveling of the plurality of shop vehicles 20 and to generate the operation command to be sent to the shop vehicles 20. The control unit 11 includes at least a position information management unit 111 and an operation command generation unit 112. A series of processes to be executed in the center server 10 may be executed by software, or may be executed by hardware.

The position information management unit 111 collects the position information (for example, latitude and longitude) from the plurality of shop vehicles 20 under the management by the center server 10, and manages the position information. The position information management unit 111 receives the current position information sent from the shop vehicle 20, periodically or in response to a request from the center server 10, and stores the position information in a vehicle management DB 121 constructed in the storage unit 12.

The operation command generation unit 112 generates the operation command relevant to the plurality of shop vehicles 20 that provides the movable market. The operation command generation unit 112 generates an operation command relevant to an operation on a previously decided route in a predetermined region where the movable market is provided, or an operation command relevant to a periodic assembly at a place where the movable market is disposed, as described in FIG. 3. The operation command generation unit 112 acquires the position information about the plurality of shop vehicles 20 that provides the movable market. Then, for example, the operation command generation unit 112 refers to the map data stored in the auxiliary storage device or the like, and generates an operation command to operate on a previously decided route from the current position as a departure spot and to go through each place where the movable market is disposed, to the plurality of shop vehicles 20. The operation command includes instructions such as an instruction to stop for a while at the place where the movable market is disposed and an instruction of the disposition position at the place.

The storage unit 12 is configured to include a main storage device and an auxiliary storage device. In the storage unit 12, the vehicle management database (DB) 121 that manages the vehicle information relevant to the plurality of shop vehicles 20 that provides the movable market is constructed. For example, the vehicle management DB 121 is a relational database for which a program of a database management system (DBMS) to be executed by a processor manages data stored in the auxiliary storage device or the like.

FIG. 5 is a diagram showing an example of the vehicle information that is stored in the vehicle management DB 121. As illustrated in FIG. 5, the vehicle information is managed as a vehicle information table. For information that is registered in the vehicle information table, a field can be added, changed or removed when appropriate. In FIG. 5, the vehicle information table has fields of region ID, group ID, assembly area ID, vehicle ID, operator ID, base ID, current position, operation state and assembly form. In the region ID, information (region ID) indicating a region where each shop vehicle 20 provides the service is stored. For example, the region ID is regional mesh information (a standardized regional mesh code, a divided regional mesh code, or the like). The information to be stored in the region ID may be information indicating a city, a ward, a town, a village or the like, or may be information indicating each of a latitude and longitude identifying the region where each shop vehicle 20 provides the service.

In the group ID, identification information (group ID) for identifying a group that includes the plurality of shop vehicles 20 constituting the movable market is stored. In the assembly area ID, information (assembly area ID) for identifying the place (area) where the movable market is disposed is stored. Similarly to the region ID, the assembly area ID may be regional mesh information, may be an address indicating the place, or may be information indicating each of a latitude and longitude identifying the area where the movable market is disposed. Here, a plurality of pieces of information indicating the place where the movable market is disposed is stored in the assembly area ID. For example, in FIG. 5, a market service by a plurality of shop vehicles 20 belonging to a group with a group ID "G001" is provided at areas with assembly area IDs "A01, A02, A03, A04" of a region ID "D000A". Further, a market service by a plurality of shop vehicles 20 identified by a group ID "G001" is provided at areas with assembly area IDs "A05, A06, A07" of the region ID "D000A".

In the vehicle ID, identification information (vehicle ID) for uniquely identifying the shop vehicle 20 that is managed by the center server 10 is stored. For example, the vehicle ID is a vehicle registration number (a number written on a number plate). In the operator ID, identification information (operator ID) for uniquely identifying an operator that sells the product or provides the labor service in the shop vehicle 20 is stored. For example, the operator ID is a business operator code that is assigned to the operator. In the base ID, information (for example, address, or latitude and longitude) indicating a place that is a base for the shop vehicle 20 is stored. The shop vehicle 20 departs from a base place identified by the base ID, and returns to the base place after the completion of the product sale or the labor service provision in a region designated by the region ID.

In the current position, the position information (for example, latitude and longitude) indicating the current position of the shop vehicle 20 is stored. The position information can include identification information (for example, link number) about a road where the shop vehicle 20 is positioned, identification information (for example, node number) about an intersection or the like, address and the like. In the operation state, status information indicating the state of the shop vehicle 20 is stored. For example, in the case where the shop vehicle 20 is moving along the route, a status of "in operation" is stored. In the case where the movable market is disposed at the place for providing the market service and where the movable market is selling the product or is providing the labor service, a status of "in service" is stored. In the case where the shop vehicle 20 has stopped the provision of the service, a status of "out of service" or the like is stored. In the assembly form, information indicating an assembly form at the time of the service provision by the plurality of shop vehicles 20 is stored. Examples of the information to be stored in the assembly form include "U-form", "J-form", "two-line form", "circle", "triangle" and "rectangle".

Figure 6:
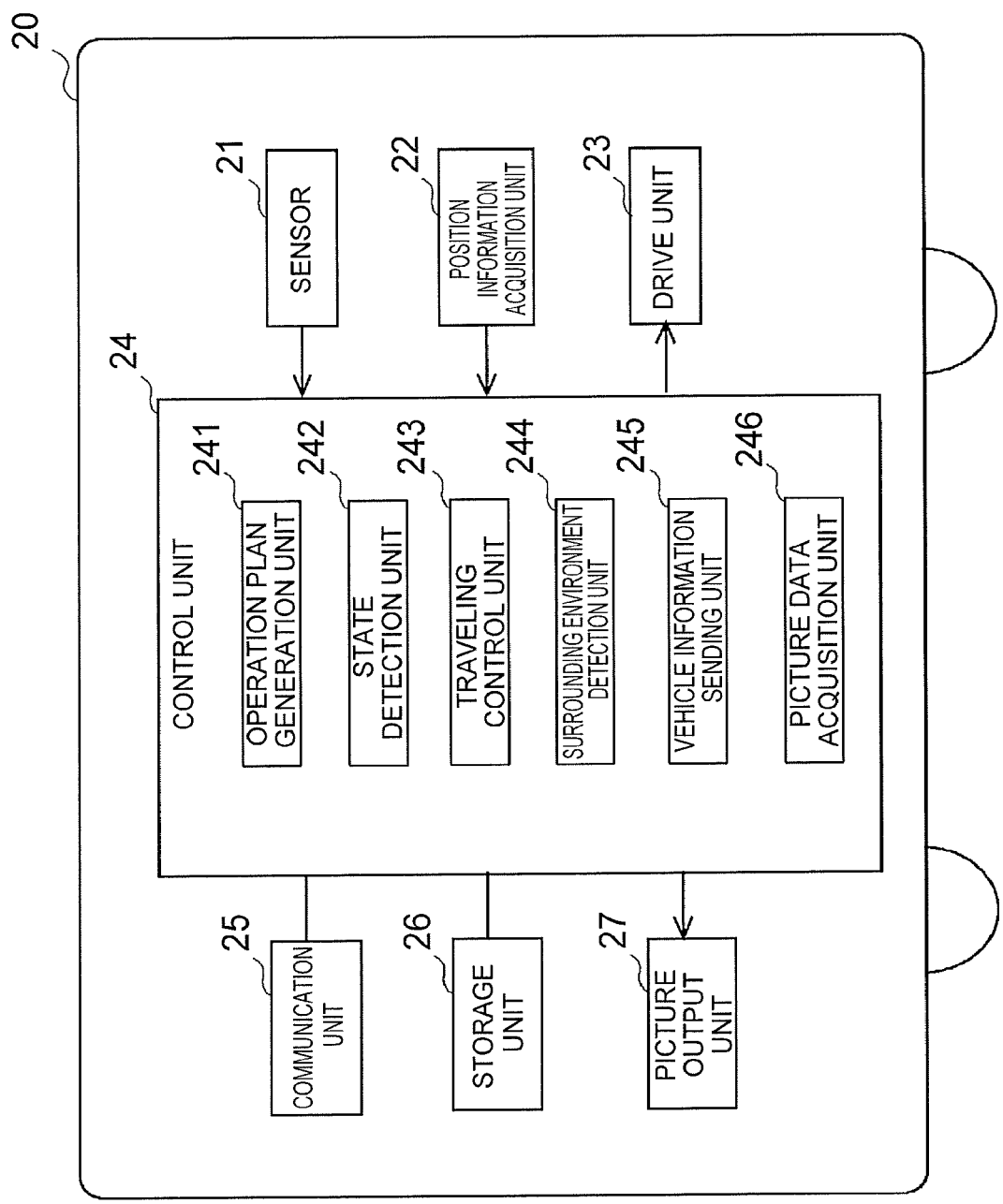
FIG. 6 is a diagram showing an example of a functional configuration of the shop vehicle.

Next, the shop vehicle 20 will be described with reference to FIG. 6. FIG. 6 is a diagram showing an example of the functional configuration of the shop vehicle 20. The shop vehicle 20 includes a sensor 21, a position information acquisition unit 22, a drive unit 23, a control unit 24, a communication unit 25, a storage unit 26 and a picture output unit 27, as functional constituent elements. The shop vehicle 20 generates a traveling route in accordance with the operation command acquired from the center server 10, and travels on a road along the route by an appropriate method for the autonomous traveling, while sensing the periphery of the shop vehicle 20.

The sensor 21 is an aggregation of sensors mounted on the shop vehicle 20, and is means for sensing the state of the shop vehicle 20 and the environment in the periphery of the shop vehicle 20 in order to acquire necessary information for the autonomous traveling. Examples of the sensor 21 for sensing the state of the shop vehicle 20 include an acceleration sensor, a speed sensor, and a magnetic field sensor. Examples of the sensor 21 for sensing the periphery of the shop vehicle 20 include a camera (a stereo camera, a visible light camera, an infrared camera and the like), a laser scanner, a LIDAR (Light Detection and Ranging, Laser Imaging Detection and Ranging), and a radar. Furthermore, examples of the sensor 21 for sensing the environment in the periphery of the shop vehicle 20 include a thermo-hygro sensor, an illuminance sensor to detect the brightness, a microphone, and a sound pressure sensor to detect a sound level. For example, information acquired by the sensor 21 is given to the control unit 24, and is used for recognizing an obstacle or a traveling lane that exists in the periphery of the shop vehicle 20. For example, the information detected by the sensor 21 may include data relevant to a congestion degree in the vicinity of the shop vehicle 20, speeds of surrounding vehicles, or the like. The data is acquired by road-vehicle communication or inter-vehicle communication.

The position information acquisition unit 22 is means for acquiring the current position of the shop vehicle 20, and is configured to include, for example, a receiver such as a global positioning system (GPS) and a global navigation satellite system (GLONASS). Information (for example, latitude and longitude) acquired by the position information acquisition unit 22 is given to the control unit 24, and for example, is used for the calculation of the route along which the shop vehicle 20 travels and a process of guidance to the destination. The position information acquisition unit 22 may detect the moving direction and vehicle speed of the shop vehicle 20, with the speed sensor, the acceleration sensor, the magnetic sensor, a gyroscope sensor and the like, and may autonomously evaluate the position information about the shop vehicle 20. The information acquired by the position information acquisition unit 22 is sent to the center server 10 or management server 30 connected to the network N1, through the communication unit 25, periodically or in response to a request from the center server 10 or the management server 30.

The drive unit 23 is means for causing the shop vehicle 20 to travel, based on a control command generated by a traveling control unit 243. For example, the drive unit 23 is configured to include a motor for driving wheels, an inverter, a brake, a steering mechanism and the like. The drive unit 23 appropriately increases or decreases controlled variables of the motor, the inverter, the brake, the steering and the like, in accordance with the control command, so that the shop vehicle 20 performs the autonomous traveling.

The control unit 24 is a computer that controls the shop vehicle 20 based on the information acquired from the sensor 21 and the position information acquisition unit 22. For example, the control unit 24 is constituted by a microcomputer including a processor such as a CPU. The control unit 24 causes the processor to read and execute a variety of programs and a variety of data that are stored in the storage unit 26, and thereby, provides a variety of processing functions appropriate for predetermined purposes. The control unit 24 provides at least an operation plan generation unit 241, a state detection unit 242, the traveling control unit 243, a surrounding environment detection unit 244, a vehicle information sending unit 245 and a picture data acquisition unit 246, as functional modules. The functional modules that are provided by the control unit 24 may be realized by hardware, or may be realized by a plurality of computers that cooperates with each other.

The operation plan generation unit 241 acquires the operation command from the center server 10, and generates an operation plan for the shop vehicle 20. The operation command includes information relevant to a departure place and destination in an instruction to the shop vehicle 20, a route passing through the destination, and the like. Accordingly, the operation plan generation unit 241 generates the operation plan, based on the destination and the route to the destination that are given from the center server 10 and the position of the shop vehicle 20 that is acquired by the position information acquisition unit 22. The operation plan includes the thus generated data relevant to the route along which the shop vehicle 20 travels and data specifying processes that should be performed by the shop vehicle 20 on a part or a whole of the route. Examples of the data included in the operation plan include the following (1) and (2).

(1) Data Expressing the Route Along which the Shop Vehicle 20 Travels as an Aggregation of Road Links For example, by referring to the map data stored in the storage unit 26, the route along which the shop vehicle 20 travels may be automatically generated based on the departure place and destination in the instruction and the route passing through the destination. The route along which the shop vehicle 20 travels and that passes through the destination may be identified by an external device such as the center server 10, instead of the shop vehicle 20. The external device such as the center server 10 may acquire the position information from the shop vehicle 20, and may identify the route along which the shop vehicle 20 should travel, in accordance with a planned operation route, and the operation command may include the data about the route.

(2) Data Expressing Processes that should be Performed by the Shop Vehicle 20 at Spots on the Route The processes that should be performed by the shop vehicle 20 include, for example, a little stop at the place where the movable market is disposed, and an instruction of a movement to the disposition position at the place, but are not limited to them. The operation plan generated by the operation plan generation unit 241 is output to the traveling control unit 243 described later.

The state detection unit 242 detects a peripheral situation necessary for the autonomous traveling, based on the data acquired by the sensor 21. Objects to be detected include, for example, the number and positions of lanes, the number and positions of vehicles that exist in the periphery of the shop vehicle 20, the number and positions of obstacles (for example, a pedestrian, a bicycle, a structure and a building) that exist in the periphery of the shop vehicle 20, the structure of a road, and a traffic sign, but are not limited to them. Any object may be detected if the object is necessary for the autonomous traveling. For example, in the case where the sensor 21 is a camera (a stereo camera, a visible light camera or an infrared camera) or the like, a physical object in the periphery of the shop vehicle 20 is detected by image processing of image data picked up by the sensor 21.

In addition to the detection of the physical object in the periphery of the shop vehicle 20, the state detection unit 242 may perform tracking of the detected physical object (may continue to detect the detected object). For example, it is possible to evaluate the relative speed of the physical object, from the difference between the coordinates of the physical object detected before one step and the current coordinates of the physical object. The data relevant to the peripheral situation detected by the state detection unit 242 is output to the traveling control unit 243 described later. Direction information that is relevant to the direction of the shop vehicle 20 and that is acquired by the sensor 21 is sent to the center server 10 or management server 30 connected to the network N1, through the communication unit 25, periodically or in response to a request from the center server 10 or the management server 30.

The traveling control unit 243 generates the control command for controlling the autonomous traveling, based on the operation plan generated by the operation plan generation unit 241, the data relevant to the peripheral situation detected by the state detection unit 242, and the position information about the shop vehicle 20 acquired by the position information acquisition unit 22. For example, the traveling control unit 243 generates the control command, such that the shop vehicle 20 travels along a predetermined route and an obstacle does not enter a predetermined safe area around the shop vehicle 20. The generated control command is output to the drive unit 23. As a method for generating the control command for the autonomous traveling, a known method can be employed.

The surrounding environment detection unit 244 detects the environment surrounding the position of the shop vehicle 20, based on the information acquired from the sensor 21 and the position information acquisition unit 22. For example, the surrounding environment detection unit 244 refers to the map data stored in the storage unit 26, and identifies the information indicating the kind of the place where the shop vehicle 20 is positioned. As the kind of the place, there are the urban section, the residential section, the mountainous section, the coastal section and the rural section. In the case where the sensor 21 includes a camera, by image processing of the image data photographed by the camera, structures such as a house, trees and the like are recognized by pattern matching, and the kind of the place where the shop vehicle 20 is positioned is estimated from the ratio of the structures, the trees and the like in the image.

In the case where the sensor 21 includes a microphone or a sound pressure sensor, the degree of silence in the periphery of the shop vehicle 20 is estimated from the measured sound pressure level, and whether there is a wind sound, a wave sound or a call of an animal such as a bird, a dog or a cat is estimated from a frequency characteristic of the sound. For example, in the case where the degree of the silence in the periphery of the shop vehicle 20 is relatively low, the surrounding environment detection unit 244 can estimate that the place where the shop vehicle 20 is positioned is an urban section, and in the case where the degree of the silence is relatively high, the surrounding environment detection unit 244 can estimate that the place where the shop vehicle 20 is positioned is a residential section, a mountainous section or a coastal section. Further, in the case where there are a wave sound, a call of a seabird or the like, the surrounding environment detection unit 244 can estimate that the place where the shop vehicle 20 is positioned is a coastal section, and in the case where there is a call of a dog, a cat or the like, the surrounding environment detection unit 244 can estimate that the place where the shop vehicle 20 is positioned is a residential section.

The surrounding environment detection unit 244 may estimate the atmosphere surrounding the shop vehicle 20, based on the traffic volume (people, motorcycles, other vehicles and the like) in the image photographed by the camera. Examples of the atmosphere include "lively", "silent", "lonely", "peaceful", "mildly" and "fresh". The surrounding environment detection unit 244 estimates the atmosphere based on the traffic volume, for example, depending on a previously decided condition for each of the kind of the place, the sound pressure level and the sound characteristic. For example, in the case where the number of persons surrounding the shop vehicle is a certain number (10) or more, where the degree of the silence is relatively low and where there are a laughing voice and the like, the surrounding environment detection unit 244 estimates that the atmosphere is "lively".

Furthermore, the surrounding environment detection unit 244 can estimate a weather condition such as fair weather, cloudy weather or rainy weather, from the color tone and brightness of the image data after image processing, and can estimate a road surface condition during traveling, from the sound pressure level and the frequency characteristic of the sound. In addition, in the case where the sensor 21 includes a thermo-hygro sensor or an illuminance sensor, the surrounding environment detection unit 244 identifies a weather condition such as existence of sunlight, from the air temperature, humidity and illuminance of the periphery of the shop vehicle 20. For example, the surrounding environment detection unit 244 estimates a meteorological condition such as "fair;  degrees (air temperature); % (humidity)", as information indicating the environment surrounding the shop vehicle 20. Further, the surrounding environment detection unit 244 estimates the degree (for example, "%") of a relative brightness when the maximum detection level of the illuminance sensor is 100%, as information indicating the environment surrounding the shop vehicle. Based on the above degree, the surrounding environment detection unit 244** may express the information indicating the relative brightness as one of multiple levels. For example, in the case of 70% or higher, an estimation of "bright" is made. In the case of 50% or higher and lower than 70%, an estimation of "slightly bright" is made. In the case of 30% or higher and lower than 50%, an estimation of "slightly dark" is made. In the case of lower than 30%, an estimation of "dark" is made.

The information (the kind of the place, the atmosphere, the meteorological condition, the brightness and the like) that indicates the surrounding environment and that is detected by the surrounding environment detection unit 244 is sent to the management server 30 connected to the network N1 through the communication unit 25, periodically or in response to a request from the management server 30.

The surrounding environment detection unit 244 may estimate information relevant to attributes of users that exist in the periphery of the shop vehicle 20, as exemplified by attributes such as age and sex, from the camera picture, and may send the estimated information to the management server 30, as user tendency information. For example, as the user tendency information, the surrounding environment detection unit 244 can send the sex and age group of users that are of the users extracted from the camera pictures and that have a high occupation ratio.

The surrounding environment detection unit 244 may give the sensor information (the camera image, thermo-hygro data, illuminance data, recorded sound data, noise level and the like) acquired by the sensor 21, to the management server 30, in association with hour information, the vehicle ID of the shop vehicle 20 and the group ID of the shop vehicle 20. The management server 30 acquires the sensor information from the shop vehicle 20. Then, based on the sensor information, the management server 30 can identify the environment surrounding the place where the plurality of shop vehicles 20 designated by the group ID is disposed.

The vehicle information sending unit 245 sends shop information about the shop vehicle 20 stored in the storage unit 26, to the management server 30 connected to the network N1, through the communication unit 25, periodically or in response to a request from the management server 30. The vehicle information sending unit 245 adds the vehicle ID for uniquely identifying the shop vehicle 20 and the group ID of the shop vehicle 20, to the shop information, and sends the shop information to the management server 30. As described later, the shop information includes shop name, handling product, operator ID, operating hours, vehicle size, capacity, information indicating the picture data that is being displayed for configuring the external appearance, and the like.

The picture data acquisition unit 246 acquires the picture data sent from the management server 30, through the communication unit 25, and stores the picture data in the storage unit 26. The picture data to be sent from the management server 30 includes a moving image, a still image, a letter string and the like. Further, the picture data includes instruction information for instructions of the color tone (color hue), the atmosphere (color scheme), the brightness (luminance and the like) for display, and the like at the time of the display of the picture data.

The communication unit 25 is communication means for connecting the shop vehicle 20 to the network N1. For example, the communication unit 25 includes a LAN interface board and a wireless communication circuit for wireless communication. In the storage unit 26, which includes a main storage device and an auxiliary storage unit, information for functioning as a shop vehicle is stored. Examples of the information for functioning as a shop vehicle include the vehicle ID given to the shop vehicle 20, the group ID of the shop vehicle 20, the shop information and the map data.

For example, the picture output unit 27 is means for outputting the picture to the vehicle-outside display devices (reference characters A to E in FIG. 2) provided on the outer walls of the vehicle body. In the embodiment, the picture data stored in the storage unit 26 is displayed by the vehicle-outside display devices, and configures the external appearance. The shop vehicle 20 causes the vehicle-outside display device to display the picture data sent from the management server 30, in accordance with the instruction information, and thereby, can set the external appearance of the shop vehicle 20 to the display content corresponding to the surrounding environment.

Figure 7:
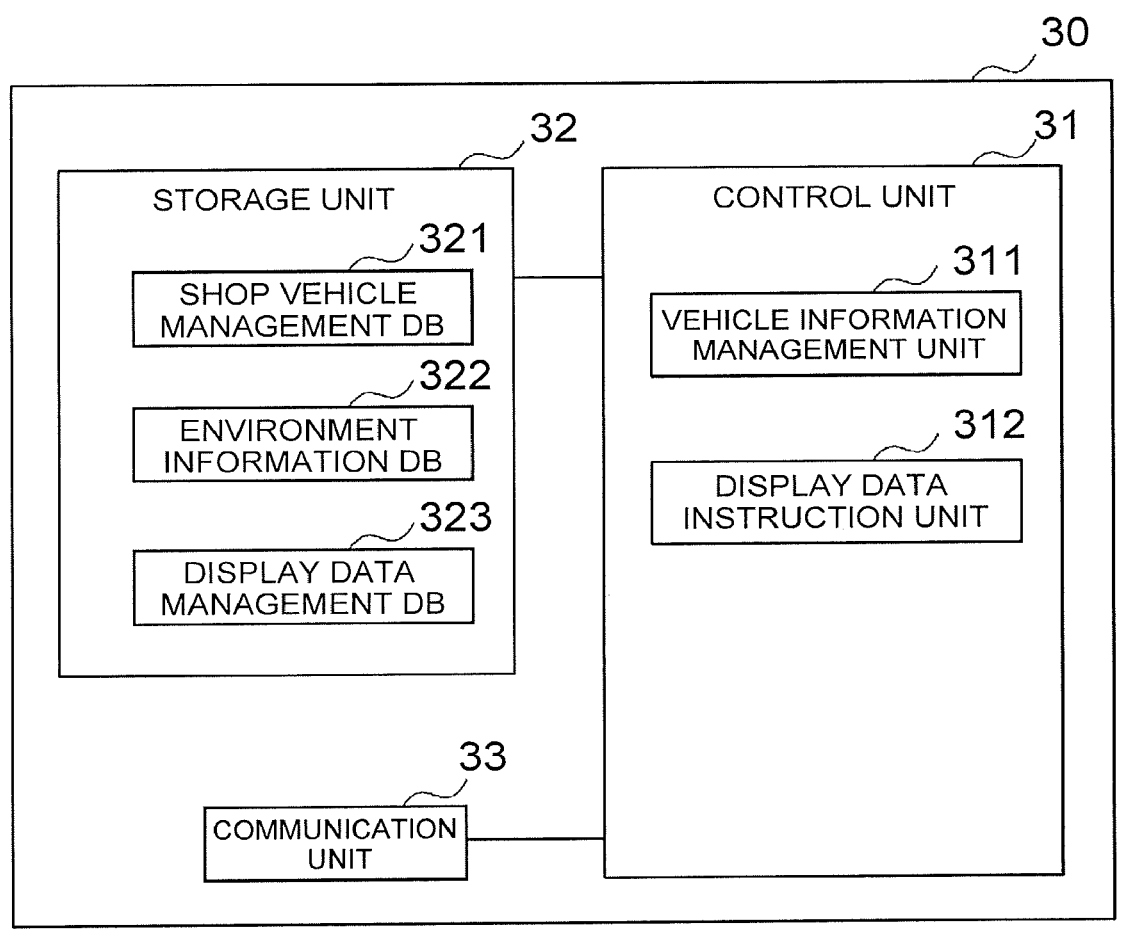
FIG. 7 is a diagram showing an example of a functional configuration of a management server.

Next, the management server 30 will be described with reference to FIG. 7. FIG. 7 is a diagram showing an example of the functional configuration of the management server 30. The management server 30 is configured to include a control unit 31, a storage unit 32 and a communication unit 33, as functional constituent elements. The communication unit 33 is the same as the communication unit 13 of the center server 10, and the description of the communication unit 33 is omitted.

Similarly to the center server 10, the management server 30 is a general-purpose computer that includes a processor, a main storage device and an auxiliary storage device. The constituent elements of the management server 30 are the constituent elements of the center server 10, and therefore, the description of the constituent elements of the management server 30 is omitted. The management server 30 may be constituted by a single computer, or may be a system constituted by a plurality of computers, as exemplified by a cloud system. For example, the management server 30 reads an OS, a variety of programs, a variety of tables and others that are stored in the auxiliary storage device, in a workspace of the main storage device, and executes the programs. By the execution of the programs, the management server 30 controls the constituent units described below, and thereby, provides functions appropriate for predetermined purposes.

The main storage device and the auxiliary storage device of the management server 30 constitute the storage unit 32. In the storage unit 32, a shop vehicle management DB 321, an environment information DB 322 and a display data management DB 323 are constructed. For example, each DB is a relational database for which a program of a database management system (DBMS) to be executed by the processor of the management server 30 manages data stored in the auxiliary storage device or the like.

The control unit 31 is an information processing function that is provided by execution of a computer program by the processor of the management server 30. The control unit 31 includes at least a vehicle information management unit 311 and a display data instruction unit 312, as constituent units. Through the control unit 31, for example, there is provided an information processing function to decide the display content of the picture data such that the external appearances are unified depending on the environment surrounding the place where a plurality of shop vehicles 20 is disposed in accordance with a predetermined purpose such as the provision of the service by the movable market. A series of processes to be executed in the management server 30 may be executed by software, or may be executed by hardware. In the following description, it is assumed that the area surrounding the place where the plurality of shop vehicles 20 is disposed includes not only an area surrounding the place where the shop vehicles 20 are disposed for the predetermined purpose, but also an area surrounding the movement route to the disposition place.

The vehicle information management unit 311 collects and manages the position information and shop information about the plurality of shop vehicles 20. The position information and shop information about each shop vehicle are acquired periodically or in response to a request from the management server 30. For each group ID, the vehicle information management unit 311 stores the acquired position information and shop information about each shop vehicle, in the shop vehicle management DB 321 constructed in the storage unit 32, in association with the corresponding vehicle ID.

Further, the vehicle information management unit 311 collects and manages the environment information relevant to the environment surrounding the plurality of shop vehicles 20. For example, the vehicle information management unit 311 acquires the environment information (the kind of the place, the atmosphere, the meteorological condition, the brightness and the like) detected by the surrounding environment detection unit 244 of each shop vehicle. The environment information is acquired from each shop vehicle periodically or in response to a request from the management server 30. For example, the environment information is acquired together with the hour information when the environment information is detected and the vehicle ID and group ID of the shop vehicle 20 about which the environment information is detected.

For example, the vehicle information management unit 311 collects the environment information about the plurality of shop vehicles 20 with an identical group ID. Then, the vehicle information management unit 311 identifies the environment information for each group ID, based on the collected environment information about each shop vehicle. The vehicle information management unit 311 may previously acquire the vehicle IDs of the shop vehicles 20 with an identical group ID, through the center server 10.

For example, the vehicle information management unit 311 identifies a frequent state in the environment information acquired from the plurality of shop vehicles 20, as the environment information about the group ID. In the case where different states in the environment information have an identical frequency, the vehicle information management unit 311 identifies the different states as the environment information about the group ID. The vehicle information management unit 311 stores the identified environment information for each shop vehicle, in the environment information DB 322 of the storage unit 32, in association with the group ID. In the case where the vehicle information management unit 311 can acquire, from the plurality of shop vehicles 20, the information (user tendency information) relevant to attributes such as the age and the sex, which are attributes of the user who exists in the periphery, the vehicle information management unit 311 identifies the user tendency information for each group ID, and stores the user tendency information in the environment information DB 322, in the above way.

The vehicle information management unit 311 may acquire the sensor information (the camera image, thermohygro data, illuminance data, recorded sound data, noise level and the like) acquired by the sensor 21 of each shop vehicle. The vehicle information management unit 311 acquires the sensor information from each shop vehicle, together with the hour information when the sensor information is acquired in the shop vehicle and the vehicle ID of the shop vehicle. The vehicle information management unit 311 identifies the environment information (the kind of the place, the meteorological condition, the brightness and the like) about the environment surrounding the position of the shop vehicle when the sensor information is acquired, by performing the same process as the process by the surrounding environment detection unit 244 of the shop vehicle 20. The vehicle information management unit 311 stores the environment information identified based on the sensor information, in the environment information DB 322, together with the hour information when the sensor information is acquired and the vehicle ID of the shop vehicle.

The vehicle information management unit 311 can refer to the map data stored in the storage unit 32, and can identify the environment information indicating the kind of the place of each shop vehicle, as exemplified by the urban section or the mountainous section, based on the position information (for example, latitude and longitude) acquired from each shop vehicle. The map data may be provided from another system connected to the network N1, for example, a geographic information system (GIS).

Furthermore, through the network N1, the vehicle information management unit 311 can acquire the camera picture obtained by photographing the area surrounding the place where each shop vehicle is disposed, based on the position information acquired from the shop vehicle. From the acquired camera picture, the vehicle information management unit 311 can estimate the environment information such as the kind of the place, the scene, the weather condition about the place where the plurality of shop vehicles 20 operates or the place where the plurality of shop vehicles 20 is disposed. As the kind of the place, there are the urban section, the residential section, the mountainous section, the coastal section and the like. Similarly, from the position information, the vehicle information management unit 311 can identify the meteorological condition surrounding the place identified by the position information. As the meteorological condition, there are the weather, the air temperature, the humidity and the like.

The display data instruction unit 312 refers to the display data management DB 323, and selects the picture data with the display content corresponding to the acquired environment information. The picture data is sent through the communication unit 33, to the plurality of shop vehicles 20 disposed at the area surrounding the place where the environment information is acquired. The plurality of shop vehicles 20 receives the picture data sent from the management server 30, and displays the picture data on the vehicle-outside display devices provided on the respective shop vehicles 20. Thereby, it is possible to configure the external appearances that are unified to the display content corresponding to the environment information.

In the case where the display data instruction unit 312 acquires, other than the environment information, the information (user tendency information) indicating the attribute tendency of the user who exists in the periphery of the plurality of shop vehicles 20, the display data instruction unit 312 may select the picture data with the display content corresponding to the user tendency information. The plurality of shop vehicles 20 can configure the external appearances that are unified to the display content corresponding to the attribute tendency of the user who exists in the periphery. Details of the process by the display data instruction unit 312 will be described later.

Next, the shop vehicle management DB 321, the environment information DB 322 and the display data management DB 323, which are constructed in the storage unit 32, will be described. FIG. 8 is a diagram showing an example of shop vehicle information that is stored in the shop vehicle management DB 321. As illustrated in FIG. 8, the shop vehicle information is managed as a shop vehicle information table for each group ID. For information that is registered in the shop vehicle information table, a field can be added, changed or removed when appropriate.

In FIG. 8, the shop vehicle information table has fields of vehicle ID, shop name, handling product, operator ID, operating hours, vehicle size, capacity, current position, external appearance and assembly form. In the information to be stored in the fields of the vehicle ID, the operator ID, the current position and assembly form is the same as that in FIG. 5, and therefore, the description of the information to be stored in the fields is omitted. In the shop name, information indicating a shop name when the market service is provided is stored. In the handling product, information indicating a category of a product that is handled as the sale service in the shop vehicle is stored. The category includes "meats", "daily sundries", "seafood" and the like. The handling product includes information (for example, the number of a table showing details of the handling product) corresponding to the kind (for example, an eating service, a tea drinking service, or an amusement) of the service that is provided in the shop vehicle. In the operating hours, information indicating a business start hour and business end hour for the product sale or labor service that is provided in the shop vehicle is stored. In the vehicle size, information indicating the size (width (W), height (H), depth (D)) of the shop vehicle is stored. In the capacity, information indicating the number of persons that can ride on the shop vehicle is stored. In the external appearance, information indicating the picture data that is being displayed for configuring the external appearance of the shop vehicle is stored.

Figure 9:
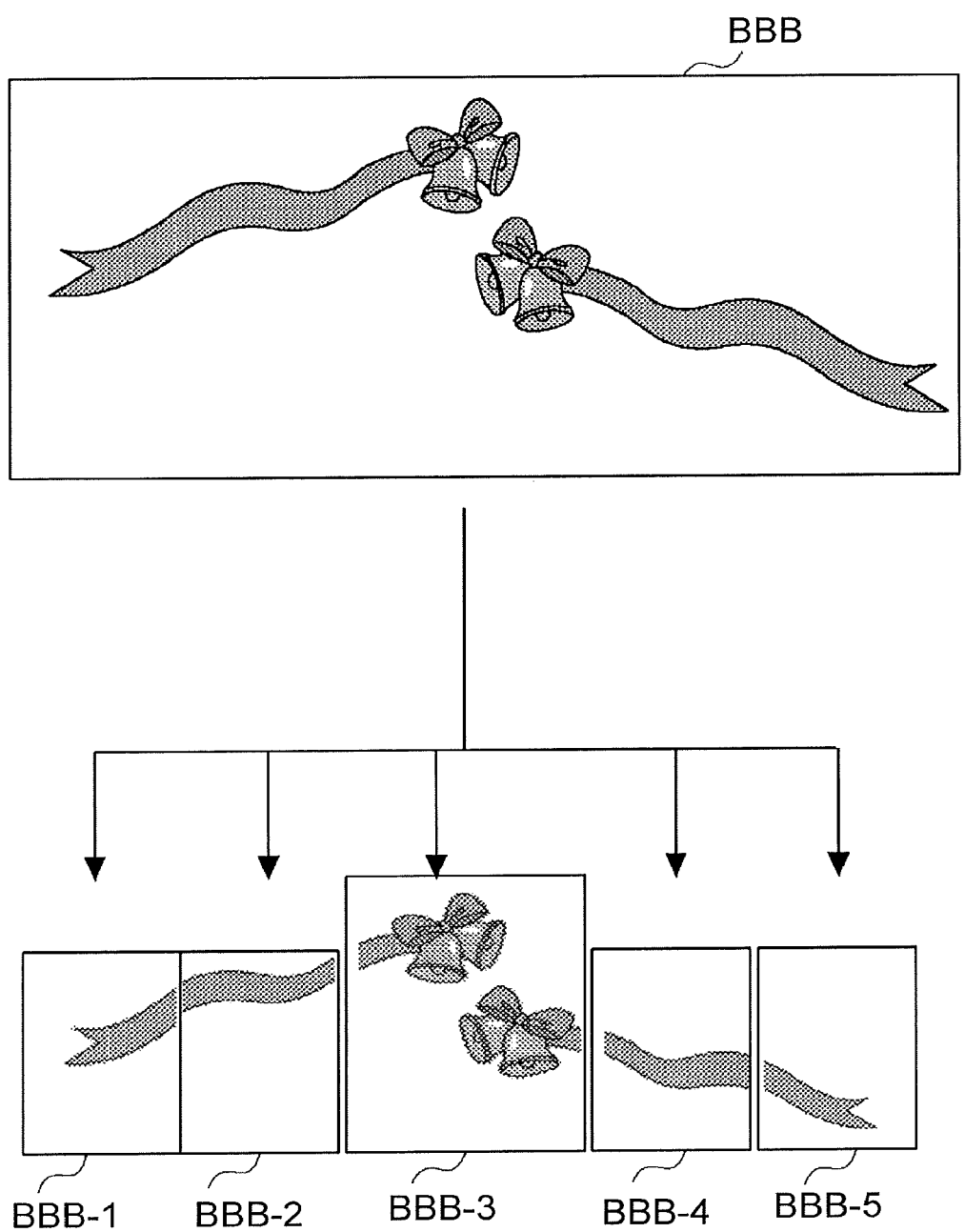
FIG. 9 is a diagram showing an example of a display manner of the picture data.

Assuming that the shop vehicles are disposed and arranged in the U-form shown in FIG. 3, the shop vehicles with vehicle IDs "S101" to "S105" in FIG. 8 correspond to the shop vehicles 20*a* to 20*e* shown in FIG. 3, respectively. Examples of the picture data to configure the external appearances of the plurality of shop vehicles 20 that is disposed and arranged in the U-form include a series of five kinds of picture data (external appearances "BBB-1" to "BBB-5") with a display content in which a decoration for a party is adopted as a motif as shown in FIG. 9. The user views the picture data divided into five kinds of partial data and displayed on the vehicle-outside display devices of the shop vehicles, and thereby, can evoke integrated picture data (BBB) with the display content in which a decoration for a party is adopted as a motif.

FIG. 10 is a diagram showing an example of the environment information that is stored in the environment information DB 322. As illustrated in FIG. 10, the environment information is managed as an environment information table for each group ID. The environment information table includes a record for each piece of the hour information when the environment information is acquired, and at the top of the table, a record relevant to the environment information acquired at the latest hour is stored. For information that is registered in the environment information, a field can be added, changed or removed when appropriate.

In FIG. 10, the environment information table has fields of hour, surrounding environment, user tendency, and operation state. Information to be stored in the operation state field is the same as that in FIG. 5, and therefore, the description of the information to be stored in the operation state field is omitted. In the hour, the hour information (date and hour) when the environment information is acquired is stored. FIG. 10 is an example of a mode in which the environment information and the like are acquired at a predetermined interval, for example, at a 10-minute interval.

In the surrounding environment, information indicating the environment surrounding the place where the plurality of shop vehicles 20 with the group ID is disposed is stored. The information indicating the environment configures subfields, and in the example of FIG. 10, the environment information such as position, kind, meteorological condition, atmosphere and brightness is stored. In the position, information indicating the place where the plurality of shop vehicles 20 is disposed is stored. In the example of FIG. 10, the assembly area ID indicating the place (area) where the movable market provided by the plurality of shop vehicles 20 with the group ID is disposed is stored. The information to be stored in the position may be regional mesh information, or may be the address indicating the place, information indicating each of a latitude and longitude identifying a range in which the plurality of shop vehicle 20 is disposed, or an average value of position information (latitude and longitude) acquired from the plurality of shop vehicles 20.

In the kind, information (the urban section, the residential section, the mountainous section, the rural section, the coastal section and the like) indicating the kind of the area surrounding the place where the plurality of shop vehicles 20 with the group ID is disposed is stored. Similarly, in the meteorological condition, information (the weather, the air temperature, the humidity and the like) indicating the meteorological condition surrounding the place where the plurality of shop vehicles 20 is disposed is stored. In the atmosphere, information indicating the atmosphere ("lively", "silent", "lonely", "peaceful", "mildly", "fresh" and the like) surrounding the place where the plurality of shop vehicles 20 is disposed is stored. In the brightness, information indicating the brightness surrounding the place where the plurality of shop vehicles 20 is disposed is stored. In the example of FIG. 10, information indicating the relative brightness that is expressed as one of four levels of "bright", "slightly bright", "slightly dark" and "dark" is stored.

In the user tendency, information indicating the attribute tendency of the user existing in the periphery of the plurality of shop vehicles 20 with the group ID is stored. In the example of FIG. 10, the attribute information such as the age group and sex of users that are of the users existing in the periphery of the plurality of shop vehicles 20 and that have a high occupation ratio is stored in subfields. In the example of FIG. 10, at a position "A01" as the place where the movable market is disposed, the ratio of "female" people in their "60"s is high, as the user tendency in the periphery of the plurality of shop vehicles 20 designated by the group ID.

In each field for the surrounding environment and user tendency to be stored in the environment information table, in the case where the corresponding information is not acquired, information (for example, "---" or a blank) indicating the absence of the information is stored.

FIG. 11 is a diagram showing an example of picture information that is stored in the display data management 323. As illustrated in FIG. 11, the picture information is managed as a picture information table. For information that is registered in the picture information, a field can be added, changed or removed when appropriate.

In FIG. 11, the picture information table has fields of picture ID, display content, color scheme tendency, picture data, partial data and relevant data. In the picture ID, identification information (picture ID) for uniquely identifying the picture data that is displayed for configuring the external appearance of the shop vehicle 20 is stored. In the display content, information indicating the display content of the picture data designated by the picture ID is stored. The display content is arbitrary reference information for classifying a display theme of the external appearance that is configured by the picture data. In the color scheme tendency, information indicating the classification of the color tone (color hue) and atmosphere (color scheme tendency) in the display of the picture data designated by the picture ID is stored. In the picture data, information (for example, data number) indicating the picture data designated by the picture ID is stored. In the partial data, information indicating partial data for causing the plurality of shop vehicles 20 to integrally display the picture data designated by the picture ID is stored. In the relevant data, information (picture ID and the like) indicating the picture data relevant to the display content of the picture data designated by the picture ID is stored. In each of the partial data and the relevant data, a plurality of pieces of information is stored. In each field of the picture information table, in the case where the corresponding information is absent, information (for example, "---" or a blank) indicating the absence of the information is stored.

In the example of FIG. 11, the theme of the display content is "decoration for party (ribbon)", and there are three kinds of picture IDs of "VA10001A", "VA10001B" and "VA10001C", in which the color scheme tendency is classified into "cold colors", "intermediate colors" and "warm colors". The picture data "BBA", "BBB" and "BBC" designated by the picture IDs have five divided partial data pieces "BBA-1 to BBA-5", five divided partial data pieces "BBB-1 to BBB-5" and five divided partial data pieces "BBC-1 to BBC-5", respectively. The picture data described with use of FIG. 9 is an example of the partial data shown by "BBB-1 to BBB-5". Here, the picture information may be classified according to the information (the urban section, the residential section, the rural section, the mountainous section, the coastal section and the like) indicating the kind of the place, and the picture information table may have a field for each display content corresponding to the picture information after the classification.

Processing Flow

Figure 12:
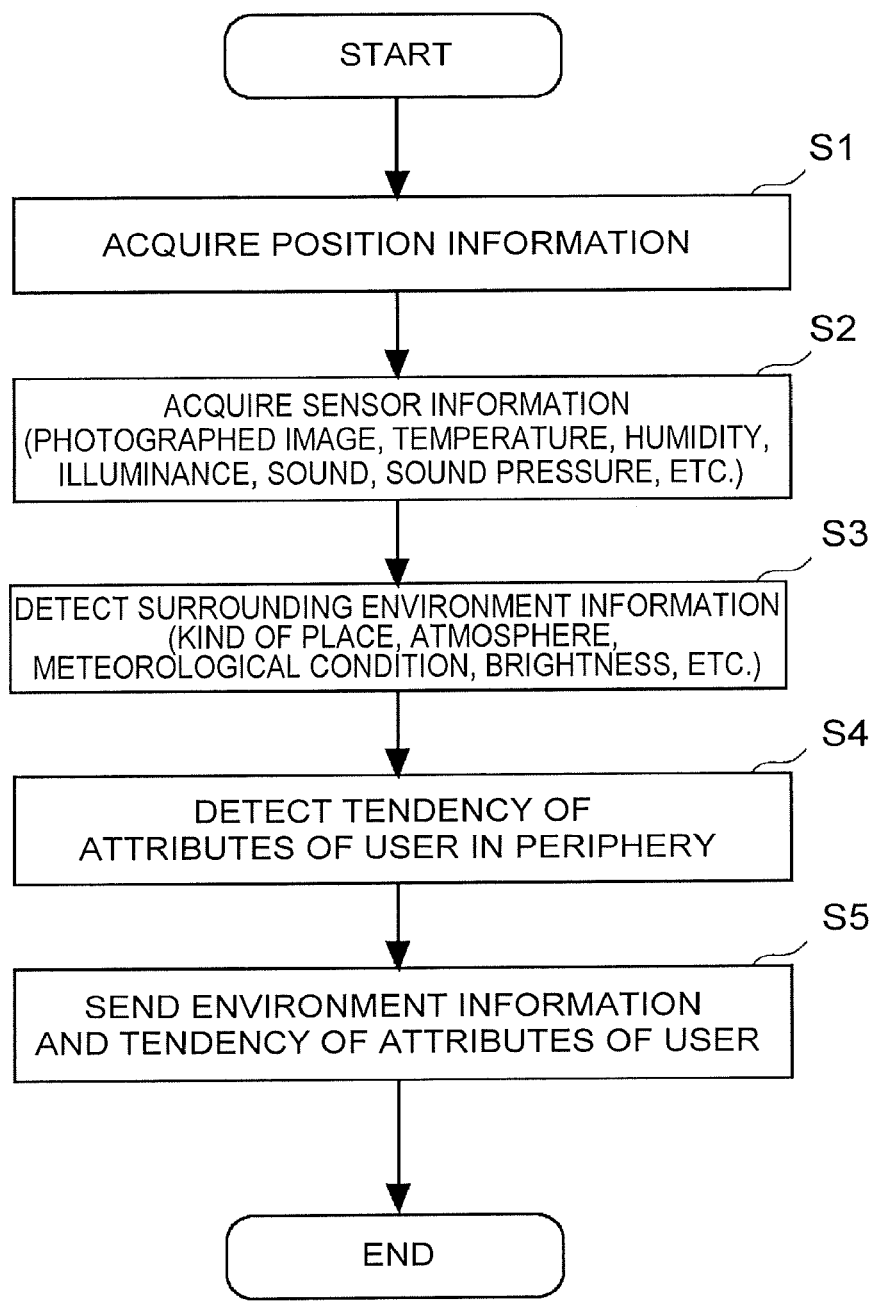
FIG. 12 is a flowchart showing an example of an acquisition process for the environment information and user tendency information by the shop vehicle.
Figure 13:
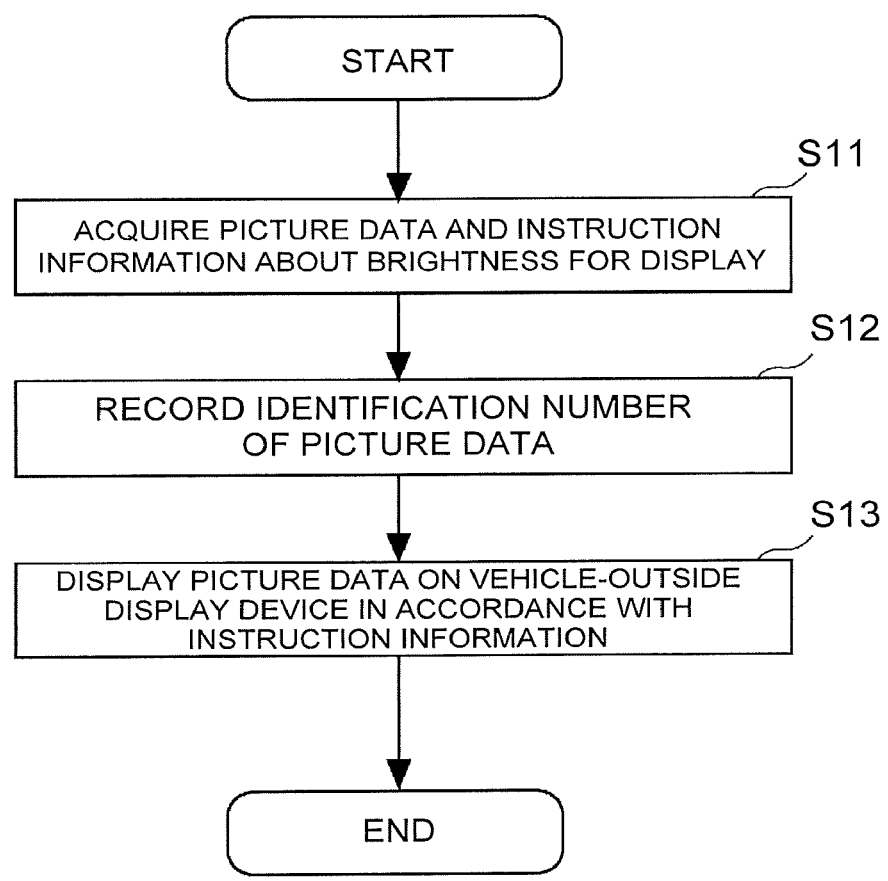
FIG. 13 is a flowchart showing an example of a picture display process by the shop vehicle.
Figure 14:
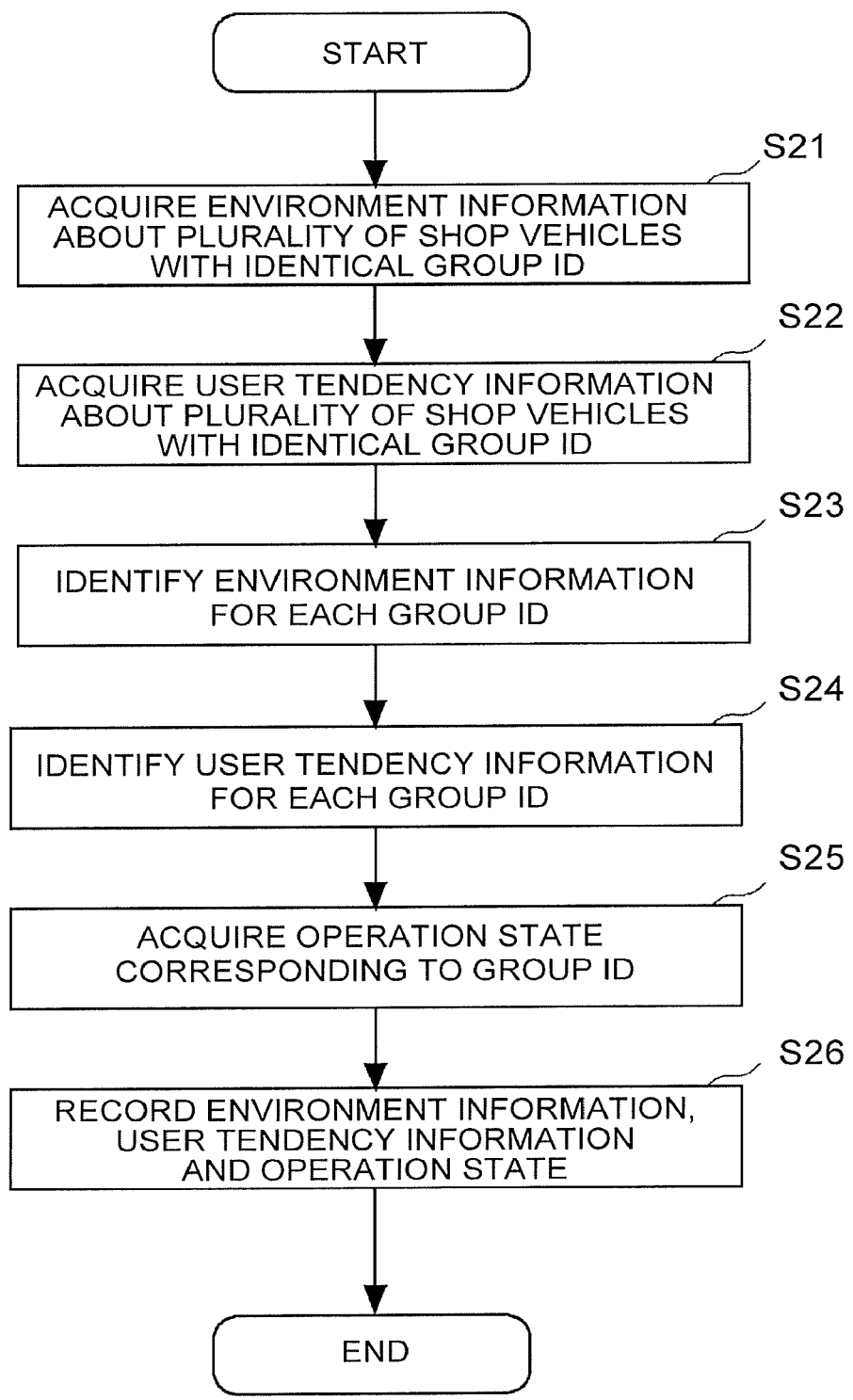
FIG. 14 is a flowchart showing an example of an acquisition process for the environment information and the user tendency information.
Figure 15:
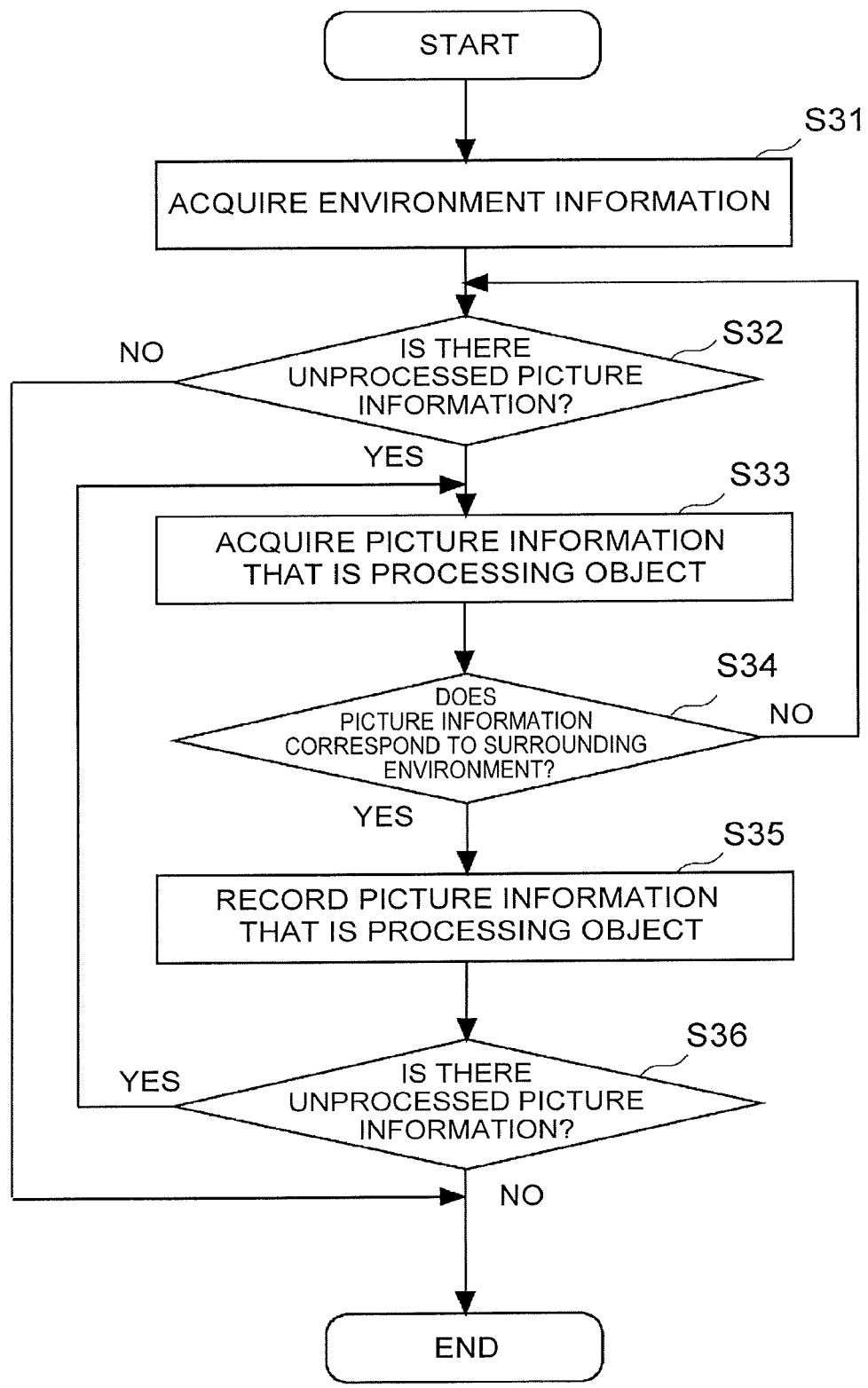
FIG. 15 is a flowchart showing an example of a selection process for a display content of the picture data.
Figure 16:
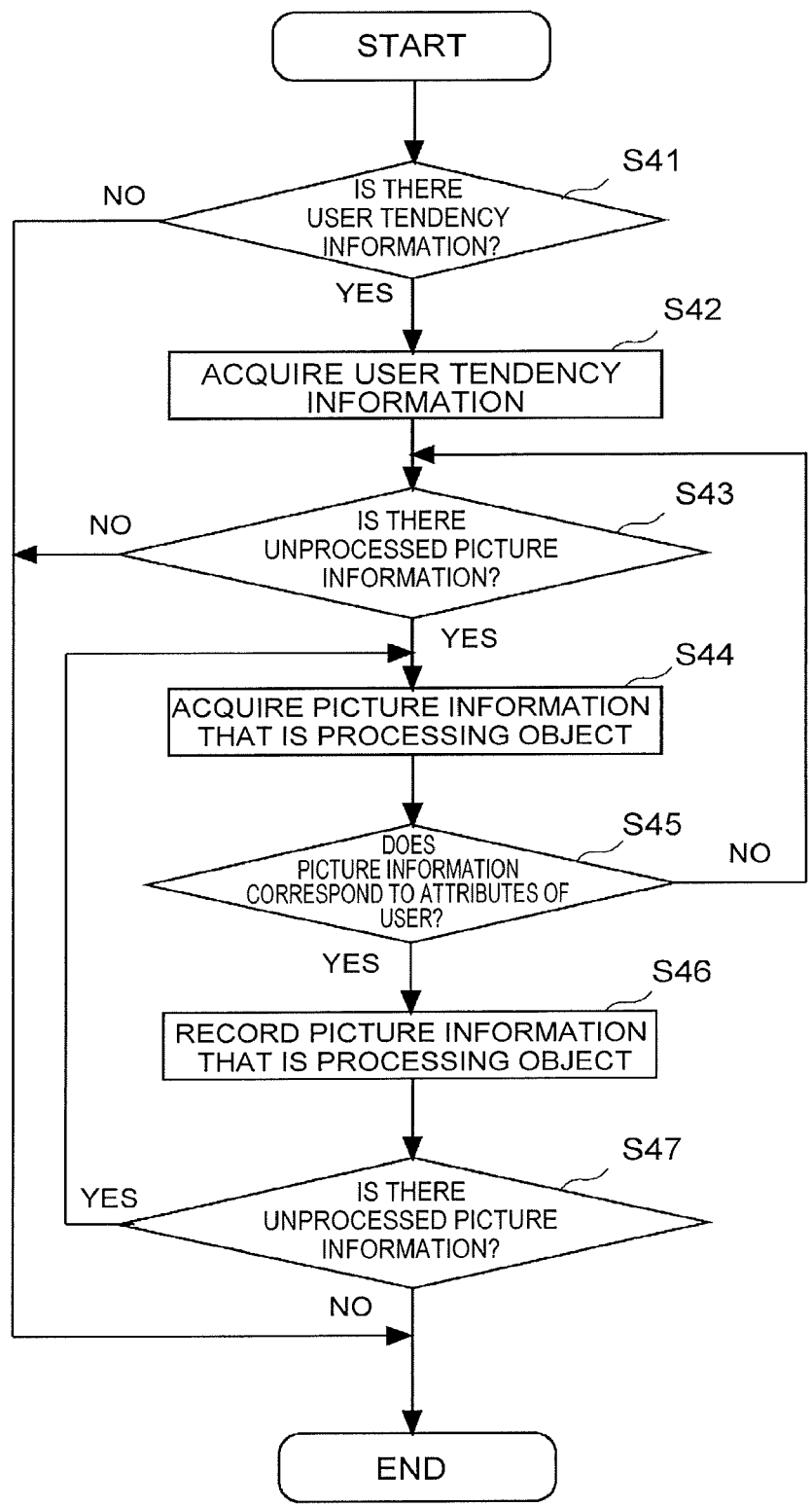
FIG. 16 is a flowchart showing an example of a selection process for the display content of the picture data that corresponds to the user tendency information.
Figure 17:
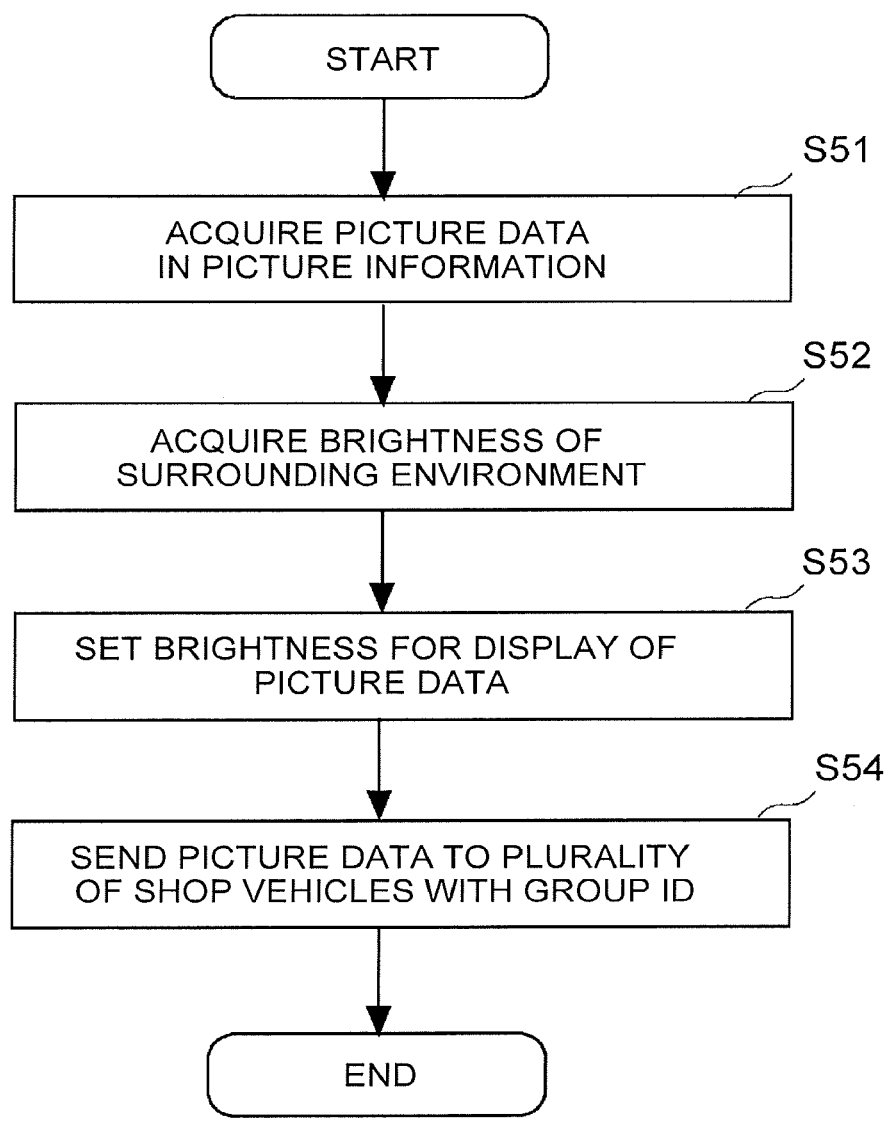
FIG. 17 is a flowchart showing an example of a sending process for the picture data.

Next, processes in the display management system 1 according to the embodiment will be described with reference to FIG. 12 to FIG. 17. The processes in FIG. 12 to FIG. 17 are periodically executed by the shop vehicles and the management server 30 that constitute the display management system 1. FIG. 12 and FIG. 13 show processes that are executed in the shop vehicle 20. FIG. 14 and FIG. 17 show processes that are executed in the management server 30. FIG. 12 is a flowchart showing an example of an acquisition process for the environment information and the user tendency information that are executed by each control unit 24 of the plurality of shop vehicles 20 disposed in accordance with a predetermined purpose such as the service provision by the movable market.

Shop Vehicle

In FIG. 12, the shop vehicle 20 acquires the position information (for example, latitude and longitude) that indicates the current position of the shop vehicle 20 and that is acquired through the position information acquisition unit 22 (S1). Further, the shop vehicle 20 acquires the sensor information detected by the sensor 21 (S2). The shop vehicle 20 acquires the sensor information for estimating the surrounding environment of the shop vehicle 20, for example, the camera image (photographed image) of the area surrounding the shop vehicle 20, which is an image photographed by the camera, the data indicating the temperature and humidity surrounding the shop vehicle 20, the illuminance data indicating the brightness, the recorded sound data for identifying the sound characteristic and the noise level, the sound pressure level, and the like. The shop vehicle 20 temporarily stores the position information and sensor information acquired in S1 and S2, in a predetermined area of the main storage device, in association with the hour information and the vehicle ID of the shop vehicle 20, and transfers the position information and the sensor information to the process of S3. The shop vehicle 20 may acquire a direction (direction information) indicating the orientation of the shop vehicle 20, through the magnetic field sensor.

Based on the position information and the sensor information, the shop vehicle 20 detects the environment information (the kind of the place, the atmosphere, the meteorological condition, the brightness and the like) surrounding the place where the shop vehicle 20 is positioned (S3). For example, the shop vehicle 20 refers to the map data, and identifies the information indicating the kind of the place, as exemplified by the urban section, the residential section, the mountainous section, the coastal section, the rural section, for the place where the shop vehicle 20 is positioned. Alternatively, for example, structures such as a house, trees and the like are recognized by pattern matching or the like, as a result of the image processing of the image data photographed by the camera, and the shop vehicle 20 estimates the kind of the place where the shop vehicle 20 is positioned, from the ratio of the structures, the trees and the like in the image. The shop vehicle 20 may reflect the frequency characteristic, sound pressure level and others of the recorded sound, in the estimation of the kind of the place where the shop vehicle 20 is positioned.

For example, the shop vehicle 20 estimates the atmosphere surrounding the shop vehicle 20, based on the traffic volume (people, motorcycles, other vehicles and the like) in the image photographed by the camera. Examples of the atmosphere include "lively", "silent", "lonely", "peaceful", "mildly" and "fresh". The shop vehicle 20 may reflect the frequency characteristic (for example, a laughing voice), the sound pressure level (the degree of silence) and the like of the recorded sound, in the estimation of the atmosphere surrounding the shop vehicle 20.

Furthermore, for example, the shop vehicle 20 estimates the weather condition such as fair weather, cloudy weather or rainy weather, from the color tone and brightness of the image data after image processing, and estimates the weather condition such as the road surface condition during traveling, from the measured sound pressure level and the frequency characteristic of the sound. The shop vehicle 20 may reflect the detected air temperature, humidity, illuminance and others, in the estimation of the meteorological condition surrounding the shop vehicle 20. For example, the shop vehicle 20 detects the meteorological condition surrounding the shop vehicle 20 that is expressed in a format of "fair;  degrees (air temperature); % (humidity)" or the like. For example, the shop vehicle 20 identifies the information indicating the relative brightness surrounding the shop vehicle 20 that is expressed as one of the four levels of "bright", "slightly bright", "slightly dark" and "dark". The shop vehicle 20 temporarily stores the detected environment information indicating the environment surrounding the shop vehicle 20, in a predetermined area of the main storage device, in association with the hour information and the vehicle ID of the shop vehicle 20, and transfers the environment information to the process of S5.

The shop vehicle 20 detects the information (user tendency information) indicating the tendency of attributes (age group and sex) of the user who exists in the periphery (S4). For example, from the picture photographed by the camera, the shop vehicle 20 detects the information relevant to attributes such as the age and the sex, which are attributes of the user who exists in the periphery of the shop vehicle 20. The shop vehicle 20 temporarily stores the detected user tendency information about the user who exists in the periphery of the shop vehicle 20, in a predetermined area of the main storage device, in association with the hour information and the vehicle ID of the shop vehicle 20, and transfers the user tendency information to the process of S5. In the case where no user exists in the periphery of the shop vehicle 20, information indicating the absence of the user is transferred to the process of the S5.

The shop vehicle 20 sends the detected environment information (the kind of the place, the atmosphere, the meteorological condition, the brightness and the like) surrounding the shop vehicle 20 and the detected user tendency information relevant to attributes such as the age group and the sex, which are attributes of the user who exists in the periphery of the shop vehicle 20, to the management server 30 (S5). The environment information and the user tendency information are sent to the management server 30 connected to the network N1, through the communication unit 25, in association with the vehicle ID of the shop vehicle 20, the group ID, the hour information and the position information. After the process of S5, the process in FIG. 12 is ended.

By the above process, in the display management system 1 according to the embodiment, the management server 30 can acquire the environment information that is relevant to the environment surrounding the shop vehicle 20 and that is detected in the shop vehicle 20, and the user tendency information relevant to attributes of the user who exists in the periphery of the shop vehicle 20. The environment information includes the kind of the place where the shop vehicles are positioned, the atmosphere, the meteorological condition, the brightness and the like. The user tendency information includes the information relevant to attributes of the user, as exemplified by the age and the sex. For example, based on the group ID and the vehicle ID, the management server 30 can identify the environment surrounding the place where the plurality of shop vehicles 20 designated by the group ID is disposed, and the tendency of attributes of the user who exists in the periphery.

Next, a picture display process that is executed by the shop vehicle 20 according to the embodiment will be described with reference to FIG. 13. FIG. 13 is a flowchart showing an example of the picture display process that is executed by each control unit 24 of the plurality of shop vehicles 20. In FIG. 13, the shop vehicle 20 acquires the picture data sent from the management server 30 to the shop vehicle 20, and the instruction information (for example, the instruction of the brightness) for displaying the picture data (S11). The picture data and the instruction information are acquired through the communication unit 25, together with the vehicle ID and the group ID of the group of the shop vehicle 20. The identification number for uniquely identifying the picture data is given to the picture data.

As described later, for example, the picture data is the picture data with display content selected so as to correspond to the environment information surrounding the place where the plurality of shop vehicles 20 with the group ID is disposed. The plurality of shop vehicles 20 causes the respective vehicle-outside display devices to display the picture data, and thereby, can configure a unified external appearance corresponding to the environment surrounding the place where the plurality of shop vehicles 20 is disposed.

The shop vehicle 20 associates and temporarily stores the acquired picture data, the identification number, the instruction information and the group ID, in a predetermined region of the main storage device. The shop vehicle 20 records the identification number of the picture data, in a predetermined area of the storage unit 26, as the information indicating the picture data to configure the external appearance that is being displayed (S12). The shop vehicle 20 transfers the acquired picture data and instruction information, to the process of S13.

The shop vehicle 20 displays the picture data on the vehicle-outside display devices (reference characters A to E in FIG. 2) provided on the outer walls and the like of the vehicle body, through the picture output unit 27, in accordance with the acquired instruction information (S13). On the vehicle-outside display devices of the shop vehicle 20, for example, the picture data sent from the management server 30 to the shop vehicle 20 is displayed in accordance with the brightness (luminance) designated by the instruction information. After the process of S13, the process in FIG. 13 is ended.

By the above process, in the display management system 1 according to the embodiment, each shop vehicle 20 can acquire the picture data sent from the management server 30 to the shop vehicle 20, together with the instruction information designating the brightness and the like for the display of the picture data. Each shop vehicle 20 causes the vehicle-outside display devices of the shop vehicle 20 to display the picture data, in accordance with the brightness (luminance) designated by the instruction information. In the display management system 1 according to the embodiment, for example, the plurality of shop vehicles 20 disposed at an area surrounding a predetermined place for a predetermined purpose such as the service provision by the movable market can display the picture data with the display content selected so as to configure a unified external appearance.

Management Server

Next, a process that is executed by the management server 30 according to the embodiment will be described. FIG. 14 is a flowchart showing an example of an acquisition process for the environment information and the user tendency information that is executed by the management server 30. By the process in FIG. 14, the environment information and user tendency information described with use of FIG. 10, that is, the environment information and user tendency information about the area surrounding the place where the plurality of shop vehicles 20 is disposed, are collected for each group ID.

In FIG. 14, the management server 30 acquires the environment information (the kind of the place, the atmosphere, the meteorological condition, the brightness and the like), from the plurality of shop vehicles 20 with an identical group ID (S21). Similarly, the management server 30 acquires the user tendency information (the age group, the sex and the like), from the plurality of shop vehicles 20 with an identical group ID (S22). For example, the acquired environment information and user tendency information are temporarily stored in a predetermined area of the main storage device constituting the storage unit 32, in association with the corresponding vehicle ID and the group ID. The management server 30 transfers the environment information and user tendency information for each vehicle ID, to the processes of S23 and S24. In the process of S22, in the case where no user exists in the periphery of the shop vehicle 20, the management server 30 transfers information indicating the absence of the user, to the process of S24, in association with the vehicle ID of the shop vehicle 20.

The management server 30 identifies the environment information for each group ID (S23). For example, the management server 30 identifies a relatively frequent state in the environment information acquired from the plurality of shop vehicles 20 with an identical group ID, as the environment information for the group ID. In the case where there is a plurality of frequent states, the management server 30 identifies the plurality of different states as the environment information for the group ID. The management server 30 transfers the identified environment information for each group ID, to the process of S26, together with the group ID.

Similarly to the process of S23, the management server 30 identifies the user tendency information for each group ID (S24). In the process of S24, the management server 30 identifies the user tendency information for each group ID, for the shop vehicle 20 around which the user exists. The management server 30 transfers the identified user tendency information for each group ID, to the process of S26, together with the group ID.

The management server 30 acquires the operation state corresponding to the group ID that is the processing object (S25). For example, the management server 30 accesses the center server 10 connected to the network N1, and acquires the operation state of each shop vehicle with the group ID. The management server 30 transfers the acquired operation state for the group ID, to the process of S26.

The management server 30 records the environment information, user tendency information and operation state for each group ID, in the environment information DB 322 constructed in the storage unit 32 (S26). The environment information table for each group ID is stored in the environment information DB 322. After the process of S26, the process in FIG. 14 is ended.

By the above process, in the display management system 1 according to the embodiment, the management server 30 can collect the environment information and user tendency information acquired from each shop vehicle designated by the group ID, and can generate the environment information table corresponding to the group ID. The generated environment information table is stored in the environment information DB 322, together with the operation state ("in motion", "in service", and the like) of each shop vehicle designated by the group ID. In the environment information DB 322, the management server 30 can manage the environment information surrounding the place where the shop vehicles for each group ID are disposed, the attribute tendency of the user who exists in the periphery of the vehicle, and the operation state.

Next, FIG. 15 will be described. FIG. 15 is a flowchart showing an example of a selection process for the display content of the picture data. The selection process is executed by the management server 30. The process in FIG. 15 is executed for each group ID. By the process in FIG. 15, for the plurality of shop vehicles 20 with the group ID, the picture data with the display content corresponding to the environment surrounding the place where the shop vehicles 20 are disposed is selected.

In FIG. 15, the management server 30 acquires the environment information relevant to the group ID that is the processing object (S31). For example, the management server 30 refers to the environment information DB 322, and identifies and acquires the environment information table corresponding to the group ID that is the processing object. The management server 30 temporarily stores the acquired environment information table corresponding to the group ID, in a predetermined area of the main storage device, and transitions to the process of S32.

The management server 30 refers to the display data management DB 323, and determines whether there is unprocessed picture information in the picture information stored in the display data management DB 323 (S32). In the case where there is no unprocessed picture information (S32, "No"), the management server 30 determines that the picture information that is the object of the selection process does not exists in the display data management DB 323, and ends the process in FIG. 15. On the other hand, in the case where there is unprocessed picture information (S32, "Yes"), the management server 30 transitions to the process of S33.

The management server 30 refers to the display data management DB 323, and acquires the picture information that is the processing object (S33). The picture information that is the processing object and that is designated by the picture ID is extracted from the display data management DB 323. The management server 30 temporarily stores the extracted picture information in a predetermined area of the main storage device, and transitions to the process of S34.

In the process of S34, the management server 30 determines whether the picture information that is the processing object corresponds to the environment surrounding the place where the shop vehicles 20 with the group ID are disposed. For example, the management server 30 identifies the information (the urban section, the residential section, the rural section, the mountainous section, the coastal section and the like) indicating the kind of the place where the shop vehicles with the group ID are disposed. Then, the management server 30 determines whether the theme stored in the display content field in the picture information is related to the kind of the place. For example, in the case where the kind of the place is the "residential section", the management server 30 determines that the picture information with a display content in which play equipment provided in a park, a decoration for a party, or the like is adopted as a motif is related to the kind of the place. For example, in the case of the urban section, the management server 30 determines that the picture information with a display content in which a tree, a fountain or the like is adopted as a motif and healing at an oasis or the like is evoked is related to the kind of the place. For example, in the case of the mountainous section, the management server 30 determines that the picture information with a display content in which the color tone of the acquired landscape is adopted as a base, or with a display content in which a festival, an illustrated story or the like corresponding to the season is adopted as a motif is related to the kind of the place. For example, in the case of the coastal section, the management server 30 determines that the picture information with a display content in which the sea, a sandy beach, a cloud floating in the fine sky, a seabird or the like is adopted as a motif and freshness is evoked is related to the kind of the place. In the above determination, the management server 30 may consider the hour information (date, hour and the like) at the time when the environment information is acquired.

Furthermore, the management server 30 may narrow down the color scheme tendency, from the atmosphere, the meteorological condition, the brightness and the like that are acquired as the environment information. For example, in an environment in which the atmosphere is "silent" or "lonely" and the brightness in "rainy weather" or "cloudy weather" is "slightly dark", the management server 30 narrows down the picture information to "intermediate colors" in which silver, gray or the like is adopted as a base and "cold colors" in which blue, white or the like is adopted as a base. In an environment in which the atmosphere is "silent" or "mildly" and the brightness in "fair weather" is "bright" or "slightly bright", the management server 30 narrows down the picture information to "warm colors" in which orange or brown is adopted as a base. The color scheme tendency may be included in the instruction information. In the example of FIG. 11, in the case where the picture data "BBB" with the color scheme tendency of warm colors is being displayed as the picture data that configures the external appearance, it is possible to switch the color tone (color hue) or the atmosphere (color scheme) that configures the external appearance to be displayed, by adding the designation of the color scheme tendency of cold colors or intermediate colors, in the instruction information. The shop vehicles to display the picture data can switch the external appearance to the color tone or atmosphere corresponding to the change in the environment information.

Furthermore, the management server 30 may perform machine learning of the acquired environment information, and may use a discriminator obtained as a result of the machine learning, as a criterion for selecting the related picture information. For example, in the case where the kind of the place is the "urban section", the management server 30 may use a discriminator that calculates the degree of the "urban section", and may determine that the display content or the color scheme tendency in the picture information corresponds to the environment information if the output of the discriminator is a threshold (for example, 0.9) or more.

In the process of S34, the management server 30 may reflect the operation state of the plurality of shop vehicles 20 designated by the group ID. For example, in the case where the operation state of the plurality of shop vehicles 20 with the group ID is "in operation", the management server 30 can determine that the plurality of shop vehicles 20 is traveling along a predetermined route as described in FIG. 3. For example, in the case where the picture information that is the processing object has a display content configured by a particular marking (pattern) such as a checkered pattern, the management server 30 determines that the picture information can configure the external appearance of the plurality of shop vehicles 20 during traveling. Then, in the picture photographed by the camera or the like, the management server 30 may identify a color element having a high ratio in the image, and may perform coloring of the marking of the above display content, using a color corresponding to the color element. For example, at the mountainous section or rural section in the autumn season, the management server 30 can display the picture data having a warm color tone with orange, brown or the like corresponding to red leaves in the periphery.

For example, in the case where the operation service is "in service", the management server 30 can determine that the plurality of shop vehicles 20 with the group ID has been disposed at a previously permitted area. For example, in the case where the picture information that is the processing object has a display content with information about the partial data or the relevant data, the management server 30 can determine that the partial data or the relevant data is included in the picture information corresponding to the environment information surrounding the place where the plurality of shop vehicles 20 is disposed. For example, from the vehicle information table described with use of FIG. 5, the management server 30 acquires the information (the arrangement form of the disposed shop vehicles 20) stored in the vehicle size, the capacity and the assembly form. Then, based on the vehicle size, the capacity, the arrangement form and the number of the shop vehicles 20, the management server 30 can select the partial data or relevant data of the display content, such that an integrated external appearance or a series of related external appearances is configured. In the case where the partial data or the relevant data is selected, the vehicle ID of a shop vehicle 20 that displays the partial data or the relevant data is designated.

In the case where the management server 30 determines that the picture information that is the processing object corresponds to the environment surrounding the place where the shop vehicles with the group ID are disposed (S34, "Yes"), the management server 30 transitions to the process of S35. On the other hand, in the case where the management server 30 determines that the picture information that is the processing object does not correspond to the environment surrounding the place where the shop vehicles with the group ID are disposed (S34, "No"), the management server 30 transitions to the process of S32.

In the process of S35, the management server 30 records the picture information that is the processing object. The management server 30 associates and records the picture information (the picture ID, the identification number of the picture data) that is the processing object, the group ID, and the hour information when the environment information is acquired, in a predetermined area of the main storage device. In the case where the partial data or the relevant data is included, the vehicle ID of a shop vehicle 20 that displays the partial data or the relevant data is recorded in association with the identification number indicating the partial data or the relevant data.

In the process of S36, the management server 30 determines whether there is unprocessed picture information, again. The management server 30 refers to the display data management DB 323. Then, in the case where there is unprocessed picture information (S36, "Yes"), the management server 30 transitions to the process of S33, and in the case where there is no unprocessed picture information (S36, "No"), the management server 30 ends the process in FIG. 15.

By the above process, the management server 30 according to the embodiment can select the picture information (the picture ID, the identification number of the picture data, and the like) with the display content corresponding to the environment surrounding the place where the plurality of shop vehicles 20 is disposed. The management server 30 can decide the display content of the picture information to configure the external appearance, depending on the kind of the place surrounding the place where the plurality of shop vehicles 20 is disposed, the atmosphere, the meteorological condition, the brightness, the hour information (date, hour and the like) when the environment information is acquired, and the like. Further, the management server 30 can reflect the operation state ("in operation", "in service" or the like) of the plurality of shop vehicles 20, in the decision of the display content of the picture information.

The picture information that is the display object may be a single kind of picture data to configure each external appearance of the plurality of shop vehicles 20, or may be picture data configured such that the plurality of shop vehicles 20 keeps an integrated external appearance. Further, the picture information may be picture data configured such that each of the plurality of shop vehicles 20 displays related picture data in line with a certain theme and the plurality of shop vehicles 20 keeps a wholly unified external appearance with the theme. In the case where the partial data or the relevant picture data is selected as the picture information that is the display object, the vehicle ID of a shop vehicle 20 that displays the partial data or the relevant picture data is designated. The management server 30 according to the embodiment can decide the picture information with the display content configured to keep a unified external appearance of the plurality of shop vehicles 20 disposed at an area surrounding a predetermined place.

Next, FIG. 16 will be described. FIG. 16 is a flowchart showing an example of a selection process for the display content of the picture data that corresponds to the user tendency information. The process in FIG. 16 is executed for each group ID. By the process in FIG. 16, for the plurality of shop vehicles 20 with the group ID, the picture data with the display content corresponding to the tendency of attributes (the age and the sex) about the user who exists in the periphery of the place where the shop vehicles are disposed is selected.

In FIG. 16, the management server 30 determines whether there is the user tendency information for the group ID that is the processing object (S41). The management server 30 refers to the environment information DB 322, and determines whether there is the information indicating user attributes stored in the user tendency field, in the environment information table corresponding to the group ID that is the processing object. In the case where there is the information indicating user attributes in the user tendency field (S41, "Yes"), the management server 30 acquires the information indicating user attributes stored in the user tendency field (S42). The management server 30 temporarily stores the acquired information indicating user attributes, in a predetermined area of the main storage device, in association with the group ID, and transitions to the process of S43. On the other hand, in the case where there is no information indicating user attributes in the user tendency field (S41, "No"), the management server 30 ends the process in FIG. 16.

In the process of S43, the management server 30 determines whether there is unprocessed picture information in the display data management DB 323. The process of S43 is the same as the process of S32 in FIG. 15, and therefore, the description of the process of S43 is omitted. In the case where there is no unprocessed picture information (S43, "No"), the management server 30 ends the process in FIG. 15, and in the case where there is unprocessed picture information (S43, "Yes"), the management server 30 transitions to the process of S44.

In the process of S43, the management server 30 may perform the processing determination, for the picture information that is selected by the process in FIG. 15 and that has the display content corresponding to the environment surrounding the place where the plurality of shop vehicles 20 is disposed. By adopting the picture information with the display content selected by the process in FIG. 15 as the determination object, the management server 30 can reflect, in the display content, the attribute tendency of the user who exists in the periphery of the plurality of shop vehicles 20, in addition to the environment surrounding the place where the plurality of shop vehicles 20 is disposed.

The management server 30 acquires the picture information that is the processing object (S44). The picture information that is the processing object is extracted from the display data management DB 323 or from the picture information selected by the process in FIG. 15. The management server 30 temporarily stores the extracted picture information in a predetermined area of the main storage device, and transitions to the process of S45.

In the process of S45, the management server 30 determines whether the picture information that is the processing object corresponds to the attribute tendency (an age group, a sex and the like having high ratios) of the user who exists in the periphery of the plurality of shop vehicles 20. For example, in the case where the ratio of female people in their 60s to 70s is high as the attribute tendency of the user, the management server 30 determines that the picture information with a display content in which a festival corresponding to the season or a small animal such as a cat or a dog is adopted as a motif and a lively atmosphere or healing is evoked is the picture information corresponding to attributes of the user. The management server 30 may perform machine learning of the information indicating the user tendency, and may use a discriminator obtained as a result of the machine learning, as a criterion for selecting the picture information relevant to the user tendency. For example, suppose that the ratio of female people in their 30s to 50s is high. The management server 30 may use a discriminator that calculates the degree of relevance to "female people in their 30s to 50s", and may determine that the display content or color scheme tendency relevant to the picture information corresponds to the information indicating the user tendency if the output of the discriminator is a threshold (for example, 0.9) or more.

In the case where the management server 30 determines that the picture information that is the processing object corresponds to the user tendency of the user who exists in the periphery of the disposed shop vehicles (S45, "Yes"), the management server 30 transitions to the process of S46. On the other hand, in the case where the management server 30 determines that the picture information that is the processing object does not correspond to the attribute tendency of the user who exists in the periphery of the disposed shop vehicles (S45, "No"), the management server 30 transitions to the process of S43.

In the process of S46, the management server 30 records the picture information that is the processing object. The management server 30 associates and records the picture information (the picture ID and the identification number of the picture data) that is the processing object, the group ID, and the hour information when the environment information is acquired, in a predetermined area of the main storage device. Then, the management server 30 transitions to the process of S47, and determines whether there is unprocessed picture information in the display data management DB 323 or in the picture information selected by the process in FIG. 15. In the case where there is unprocessed picture information in the display data management DB 323 or in the selected picture information (S47, "Yes"), the management server 30 transitions to the process of S44, and in the case where there is no unprocessed picture information (S47, "No"), the management server 30 ends the process in FIG. 16.

By the above process, for the plurality of shop vehicles 20 with the group ID, the management server 30 according to the embodiment can select the picture information (the picture ID, the identification number of the picture data, and the like) with the display content corresponding to the tendency of attributes (the age and the sex) about the user who exists in the periphery of the area where the shop vehicles 20 are disposed. By adopting the picture information with the display content selected by the process in FIG. 15 as the determination object, the management server 30 can reflect, in the display content, the attribute tendency of the user who exists in the periphery of the plurality of shop vehicles 20, in addition to the environment surrounding the place where the plurality of shop vehicles 20 is disposed.

Next, FIG. 17 will be described. FIG. 17 is a flowchart showing an example of a sending process for the picture data with the selected display content. The process in FIG. 17 is executed for each group ID. By the process in FIG. 17, the picture data with the display content corresponding to the environment surrounding the place where the plurality of shop vehicles 20 with the group ID is disposed and the tendency of attributes (the age and the sex) of the user who exists in the periphery is sent to the plurality of shop vehicles 20 with the group ID.

In FIG. 17, the management server 30 acquires the picture data and the identification number in the picture information selected by the processes in FIG. 15 and FIG. 16 (S51). Further, the management server 30 refers to the environment information DB 322, and acquires the information indicating the brightness of the surrounding environment, in the environment information table corresponding to the group ID that is the processing object (S52). Then, the management server 30 sets the brightness (luminance) for the display of the picture data, based on the acquired brightness of the surrounding environment (S53).

For example, the management server 30 sets the degree (for example, "%") of a relative brightness when the maximum luminance of the vehicle-outside display device of each shop vehicle is 100%. For example, in the case where the brightness of the surrounding environment is "slightly dark", the management server 30 sets the brightness (luminance) for the display of the picture data to "50%", and in the case where the brightness of the surrounding environment is "slightly bright" or "bright", the management server 30 sets the brightness (luminance) for the display of the picture data to "70%". In the instruction of the luminance, the management server 30 may reflect the kind of the place, the meteorological condition, the atmosphere and the user tendency information. The management server 30 transfers the instruction information about the set luminance of the picture data, to the process of S54**.

In the process of S54, to the plurality of shop vehicles 20 with the group ID, the management server 30 sends the picture data selected based on the surrounding environment, the attribute tendency of the user and the like, together with the instruction information designating the brightness (luminance) for display. The picture data includes the picture ID in the picture information and the identification number given to the picture data. The picture data may include a data source (for example, a universal resource locator (URL)) of the picture data. After the process of S54, the process in FIG. 17 is ended.

By the above process, the management server 30 according to the embodiment can designate the luminance (instruction information) corresponding to the environment surrounding the place where the plurality of shop vehicles 20 is disposed, and can send the picture information (the picture ID, the identification number of the picture data, and the like) with the selected display content, to the shop vehicles. The shop vehicles with the group ID can acquire the picture data sent from the management server 30, together with the instruction information, and can display the picture data in accordance with the instruction information.

First Modification

In the first embodiment, the management server 30 acquires the information relevant to the environment information and the attribute tendency of the user, and the like, from the plurality of shop vehicles 20 disposed at an area surrounding a predetermined place. In a first modification, for example, the management server 30 selects a shop vehicle 20 (hereinafter, also referred to as a leader vehicle) that is a leader, from the plurality of shop vehicles 20 designated by the group ID.

For example, in the case where the plurality of shop vehicles (20a to 20e) disposed in a predetermined place is arranged in a U-form as shown in the broken-line balloon in FIG. 3, the shop vehicle 20c arranged at the center may be selected as the leader vehicle. In the case where the plurality of shop vehicles is traveling along the route in a row, the shop vehicle 20 at the head may be selected as the leader vehicle. The leader vehicle may be designated in view of the total number of shop vehicles 20 disposed at a predetermined place, the size of a shop vehicle 20 (for example, a shop vehicle 20 having a relatively large size), the type of the handling product, and the like. Thus, the leader vehicle can be previously selected in consideration of the arrangement form during service provision, the traveling form during traveling, the total number of shop vehicles 20 disposed in a predetermined area, the size of a shop vehicle 20, the handling product, and the like.

The management server 30 selects the picture data with the display content to configure a unified external appearance of the plurality of shop vehicles 20, based on the environment information, the information relevant to the attribute tendency of the user, and the like, which are acquired through the leader vehicle. In the first modification, it is possible to control the shop vehicles with the group ID, so as to keep a unified external appearance, based on the picture data with a display content corresponding to the environment surrounding the place where the leader vehicle is positioned and attributes of the user who exists in the periphery of the leader vehicle. In the first modification, it is possible to reduce a processing load for communication between the management server 30 and the shop vehicles.

Second Modification

Figure 18:
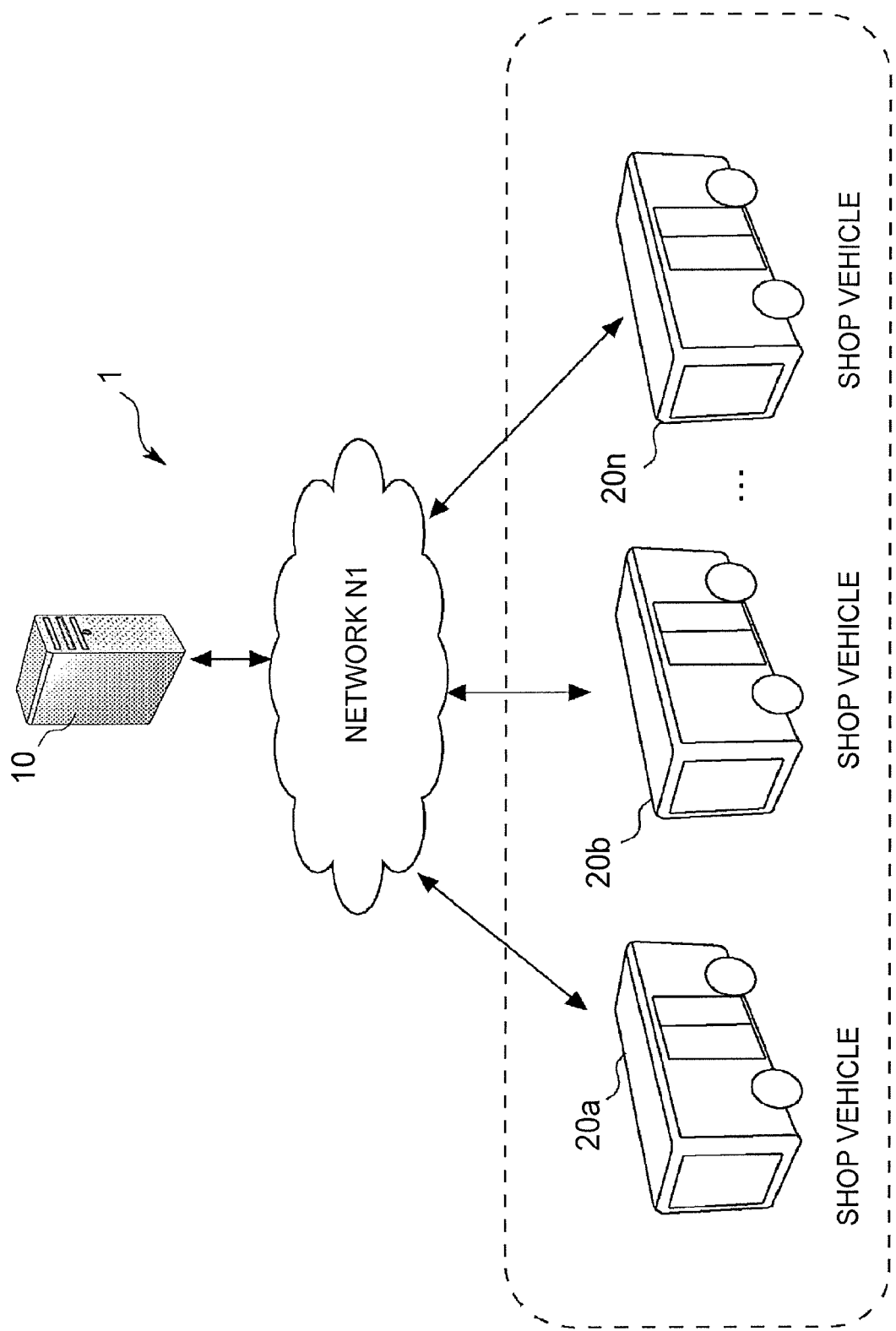
FIG. 18 is a diagram showing an example of a system configuration of a display management system according to a second modification.

The leader vehicle of the plurality of shop vehicles 20 may be configured to have the function of the management server 30. FIG. 18 is a diagram showing an example of a system configuration of a display management system 1 according to a second modification. As shown in FIG. 18, the display management system 1 in the second modification is constituted by a center server 10 that is mutually connected through the network N1, and a plurality of shop vehicles (20a to 20n) including a leader vehicle (for example, the shop vehicle 20a). The functional configuration of the center server 10 and the functional configuration of the shop vehicles 20 other than the leader vehicle are the same as those in the first embodiment. The second modification is different from the first embodiment, in that the leader vehicle is included in the plurality of shop vehicles (20a to 20n) and the management server 30 is not included. The differences from the first embodiment will be mainly described below. Similarly to the first modification, the leader vehicle is previously designated based on the arrangement form, the traveling form, the number of disposed shop vehicles 20, and the like.

In the second modification, the shop vehicle 20 that functions as the leader vehicle manages the picture data with display content that is displayed by the vehicle-outside display devices such that the plurality of shop vehicles 20 keeps a unified external appearance. Further, similarly to the management server 30 in the first embodiment, the leader vehicle acquires the environment information relevant to the environment surrounding the place where the plurality of shop vehicles 20 is disposed and the information (user tendency information) relevant to attributes of the user who exists in the periphery. Similarly to the management server 30 in the first embodiment, the shop vehicle 20 that functions as the leader vehicle selects the picture data with the display content corresponding to the environment information and the user tendency information, and instructs the vehicle-outside display devices of the shop vehicles to display the selected picture data.

FIG. 19 is a diagram showing an example of a functional configuration of the shop vehicle 20 that functions as the leader vehicle in the second modification. As illustrated in FIG. 19, the shop vehicle 20 that functions as the leader vehicle includes a sensor 21, a position information acquisition unit 22, a drive unit 23, a control unit 24, a communication unit 25, a storage unit 26 and a picture output unit 27, as functional constituent elements. In addition to the functional modules shown in the first embodiment, the shop vehicle 20 that functions as the leader vehicle in the second modification includes a vehicle information management unit 247 and a display data instruction unit 248 in the control unit 24, as functional modules. Further, the leader vehicle in the second modification includes a shop vehicle management DB 261, an environment information DB 262 and a display data management DB 263 in the storage unit 26.

The vehicle information management unit 247 and the display data instruction unit 248, which are functional modules, correspond to the vehicle information management unit 311 and the display data instruction unit 312 of the management server 30 in the first embodiment, respectively. Further, the shop vehicle management DB 261, the environment information DB 262 and the display data management DB 263 constructed in the storage unit 26 correspond to the shop vehicle management DB 321, the environment information DB 322 and the display data management DB 323 constructed in the storage unit 32 of the management server 30 in the first embodiment, respectively.

The shop vehicle 20 that functions as the leader vehicle in the second modification executes the processes described in FIG. 12 to FIG. 17. Thereby, in the second modification, the picture information (the picture ID, the identification number of the picture data, and the like) acquired through the leader vehicle, that is, the picture information with the display content corresponding to the environment surrounding the place where the shop vehicles are disposed and the attribute information about the user who exists in the periphery is selected. Then, the leader vehicle in the second modification sends the selected picture data to the shop vehicles, through the network N1 or inter-vehicle communication, together with the instruction information designating the brightness for display, and the like. Based on the information sent from the leader vehicle, each shop vehicle causes the vehicle-outside display device of the shop vehicle to display the picture data in accordance with the brightness (luminance) designated by the instruction information. In the second modification also, it is possible to configure a unified external appearance, based on the picture data with the display content corresponding to the environment surrounding the place where the plurality of shop vehicles 20 is disposed and the attribute tendency of the user in the periphery.

The display management system 1 according to the second modification can provide the technology for keeping a unified external appearance of the plurality of shop vehicles 20 disposed at an area surrounding a predetermined place, in a configuration in which the management server 30 in the first embodiment is not included.

Third Modification

In the first embodiment, the first modification and the second modification, for the plurality of shop vehicles 20 that sells the product or provides the labor service, the technology for keeping a unified external appearance based on the picture data with the display content corresponding to the environment surrounding the place where the plurality of shop vehicles 20 is disposed and the attribute tendency of the user has been described. The technology in the disclosure can be applied to other movable objects including a display unit (vehicle-outside display device) that can display the picture data for configuring the external appearance. For example, the technology in the disclosure can be applied when a plurality of movable objects that provides a logistics service and that can perform the autonomous traveling travels along a predetermined route in a row or assembles at a distribution center or the like. Similarly, the technology in the disclosure can be applied to a sightseeing tour using a plurality of movable objects that provides a movement service to utilizing persons. The plurality of movable objects that provides the above service can unify the external appearances of the movable objects, based on the picture data with the display content corresponding to information about the environment surrounding an area where the movable objects travel or an area where the movable objects assemble and the attribute tendency of the user.

Other Embodiment

Each of the above embodiments is just an example, and the disclosure for the embodiments can be carried out, while being appropriately modified without departing from the spirit. The processes and means described in the disclosure can be arbitrarily combined to be carried out, as long as technical consistency is kept.

A process described as a process that is executed by one device may be executed by a plurality of devices in cooperation. Further, processes described as processes that are executed by different devices may be executed by one device. In the computer system, the hardware configuration (server configuration) that realizes each function can be flexibly changed.

A program that realizes one of the above functions with an information processing device or another machine or device (hereinafter, referred to as a computer or the like) can be recorded in a recording medium that can be read by the computer or the like. Further, the computer or the like reads and executes the program in the recording medium, and thereby, can provide the function.

Here, the recording medium that can be read by the computer or the like means a recording medium that can accumulate information such as data and programs by an electrical, magnetic, optical, mechanical or chemical action and that can be read by the computer or the like. Among such recording media, examples of a recording medium that can be detached from the computer or the like include a flexible disk, a magnetic optical disc, a CD-ROM, a CD-R/W, a DVD, a Blu-ray disc, a DAT, a 8-mm tape, and a memory card such as a flash memory. Further, examples of a recording medium fixed in the computer or the like include a hard disk and a ROM.

What is claimed is:

1. An information processing device comprising a control unit that executes:
   acquiring information indicating an environment surrounding a place where a plurality of movable objects is disposed, the plurality of movable objects including display units that display a picture to configure an external appearance, wherein the information indicating the environment includes landscape information identifying a motif and at least one color tone of a surrounding landscape;
   deciding a display content of the picture to be displayed by the display units included in the plurality of movable objects, depending on the information indicating the environment surrounding the place, wherein the display content of the picture includes at least one of a designation of a color tone of the picture and a designation of a brightness when the picture is displayed; and
   giving an instruction to cause the display units of the plurality of moveable objects at an area surrounding the place to change from a previously displayed picture to the picture having the decided display content including the motif and the at least one color tone of the surrounding landscape, so that the plurality of moveable objects have an external appearance that is unified and complementary to an appearance of the surrounding landscape.

2. The information processing device according to claim 1, wherein the information indicating the environment surrounding the place includes at least one of information indicating a kind of the place where the plurality of movable objects is disposed, information indicating a scene surrounding the place, information indicating a meteorological condition, and information indicating a brightness surrounding the place.

3. The information processing device according to claim 1, wherein the control unit acquires the information indicating the environment surrounding the place, based on sensor information that is detected by sensors respectively included in the plurality of movable objects.

4. The information processing device according to claim 1, wherein the control unit executes identifying the place where the plurality of movable objects is disposed, from position information indicating respective positions of the plurality of movable objects, and acquiring the information indicating the environment surrounding the place, based on the identified place.

5. The information processing device according to claim 1, wherein the display content of the picture further includes at least one of a designation of a content to be displayed by the picture, and a designation of a display configuration of the picture when the picture is displayed.

6. The information processing device according to claim 1, wherein the control unit further executes:
   acquiring attribute information indicating an attribute of a utilizing person that exists in a periphery of the plurality of movable objects; and
   deciding the display content of the picture to be displayed by the display units included in the plurality of movable objects, depending on the attribute information.

7. An information processing method comprising:
   acquiring information indicating an environment surrounding a place where a plurality of movable objects is disposed, the plurality of movable objects including display units that display a picture to configure an external appearance, wherein the information indicating the environment includes landscape information identifying a motif and at least one color tone of a surrounding landscape;

deciding a display content of the picture to be displayed by the display units included in the plurality of movable objects, depending on the information indicating the environment surrounding the place, wherein the display content of the picture includes at least one of a designation of a color tone of the picture and a designation of a brightness when the picture is displayed; and giving an instruction to cause the display units of the plurality of moveable objects at an area surrounding the place to change from a previously displayed picture to the picture having the decided display content including the motif and the at least one color tone of the surrounding landscape, so that the plurality of moveable objects have an external appearance that is unified and complementary to an appearance of the surrounding landscape.

8. A non-transitory program that causes a computer to execute:

acquiring information indicating an environment surrounding a place where a plurality of movable objects is disposed, the plurality of movable objects including display units that display a picture to configure an external appearance, wherein the information indicating the environment includes landscape information identifying a motif and at least one color tone of a surrounding landscape;

deciding a display content of the picture to be displayed by the display units included in the plurality of movable objects, depending on the information indicating the environment surrounding the place, wherein the display content of the picture includes at least one of a designation of a color tone of the picture and a designation of a brightness when the picture is displayed; and giving an instruction to cause the display units of the plurality of moveable objects at an area surrounding the place to change from a previously displayed picture to the picture having the decided display content including the motif and the at least one color tone of the surrounding landscape, so that the plurality of moveable objects have an external appearance that is unified and complementary to an appearance of the surrounding landscape.

* * * * *